US 6,664,973 B1

(12) United States Patent
Iwamoto et al.

(10) Patent No.: US 6,664,973 B1
(45) Date of Patent: Dec. 16, 2003

(54) IMAGE PROCESSING APPARATUS, METHOD FOR PROCESSING AND IMAGE AND COMPUTER-READABLE RECORDING MEDIUM FOR CAUSING A COMPUTER TO PROCESS IMAGES

(75) Inventors: Masayuki Iwamoto, Kawasaki (JP); Koichi Fujimura, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/553,322

(22) Filed: Apr. 20, 2000

(30) Foreign Application Priority Data

Apr. 28, 1996 (JP) .......................... 11-122186
Oct. 28, 1999 (JP) .......................... 11-306384

(51) Int. Cl.$^7$ ............................... G06K 9/40
(52) U.S. Cl. ................... 345/589; 345/590; 345/690; 345/698; 382/167; 382/274; 382/169; 348/223.1; 348/655; 348/254; 358/461; 358/518
(58) Field of Search ................... 345/589, 581, 345/590, 591, 604, 603, 690, 698; 348/223.1, 655, 254; 382/167, 169, 274; 358/461, 448, 518

(56) References Cited

U.S. PATENT DOCUMENTS

| | | | | |
|---|---|---|---|---|
| 4,635,101 A | * | 1/1987 | Nakayama ................... 348/578 |
| 5,123,060 A | * | 6/1992 | Cho et al. .................... 382/274 |
| 5,181,105 A | * | 1/1993 | Udagawa et al. .............. 358/80 |
| 5,194,960 A | * | 3/1993 | Ota ............................ 358/228 |
| 5,410,418 A | * | 4/1995 | Yonezawa .................... 382/169 |
| 5,420,635 A | * | 5/1995 | Konishi et al. ............... 348/362 |
| 5,457,477 A | * | 10/1995 | Wang et al. ................. 345/150 |
| 5,619,347 A | * | 4/1997 | Taniguchi et al. ........... 358/516 |
| 5,668,890 A | * | 9/1997 | Winkelman .................. 382/167 |
| 5,715,377 A | * | 2/1998 | Fukushima et al. .......... 395/109 |
| 5,757,378 A | * | 5/1998 | Ikeda .......................... 345/591 |
| 5,875,262 A | * | 2/1999 | Asada .......................... 382/169 |
| 5,940,530 A | * | 8/1999 | Fukushima et al. .......... 382/164 |
| 5,974,190 A | * | 10/1999 | Maeda et al. ................ 382/255 |
| 5,978,106 A | * | 11/1999 | Hayashi ....................... 358/518 |
| 6,031,543 A | * | 2/2000 | Miyashita et al. ........... 345/593 |
| 6,081,254 A | * | 6/2000 | Tanaka et al. ............... 345/154 |
| 6,101,272 A | * | 8/2000 | Noguchi ...................... 382/167 |
| 6,285,398 B1 | * | 9/2001 | Shinsky et al. .............. 348/223 |
| 6,319,198 B1 | * | 11/2001 | Takahashi .................... 600/180 |
| 6,326,977 B1 | * | 12/2001 | Westerman .................. 345/591 |
| 6,448,955 B1 | * | 9/2002 | Evanicky et al. ............ 345/102 |
| 6,493,468 B1 | * | 12/2002 | Matsuura ..................... 382/274 |

* cited by examiner

Primary Examiner—Jeffery Brier
Assistant Examiner—Daniel Chung
(74) Attorney, Agent, or Firm—Staas & Halsey LLP

(57) ABSTRACT

In an image processing apparatus according to the present invention, a brightest luminance value of the pixels of the processing image and a darkest luminance value of the pixels of the processing image are detected. An improper white balance and a luminance gradation of the processing image are corrected. Moreover, a luminance distribution of the processing image is leveled. Furthermore, the luminance of the processing image is adjusted based on the γ-value

19 Claims, 26 Drawing Sheets

```
START
  ↓
TRANSFORM COLOR SPACE OF INPUT IMAGE   ┐ ST1
INTO Lab COLOR SPACE                    ┘
  ↓
END
```

[A] : TRANSFORMING MATRIX

SD VALUE   MEDIAN   HL VALUE

AVERAGE   MEDIAN
REFERENCE VALUE OF
L-VALUE CORRECTION

SD VALUE   HL VALUE

SD ←───── REFERENCE VALUE ─────→ HL
OF L-VALUE
CORRECTION

FIG. 20A
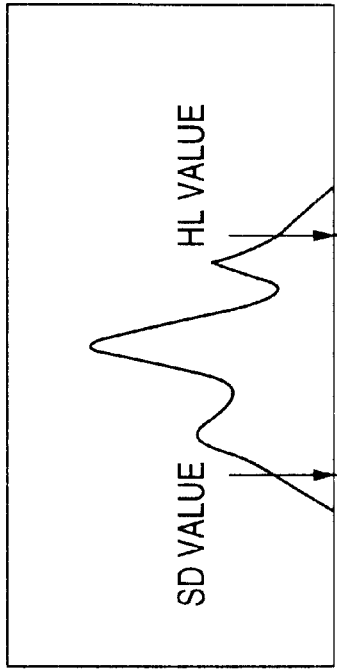
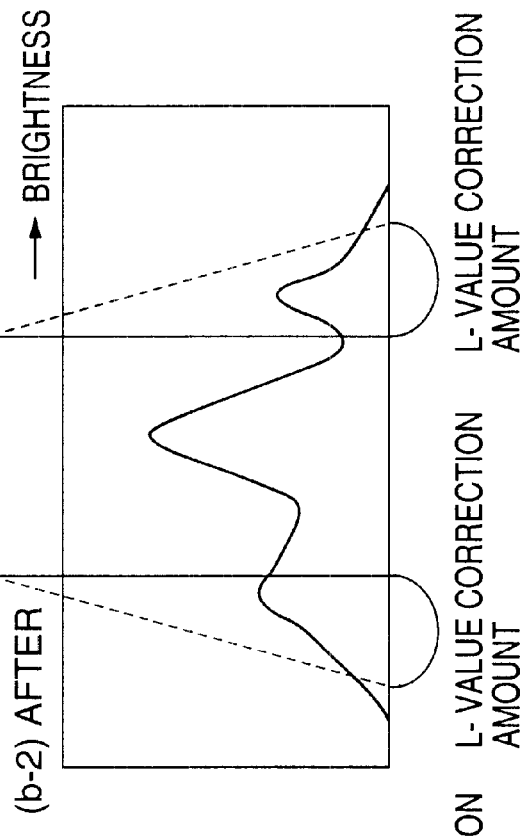
FIG. 20B
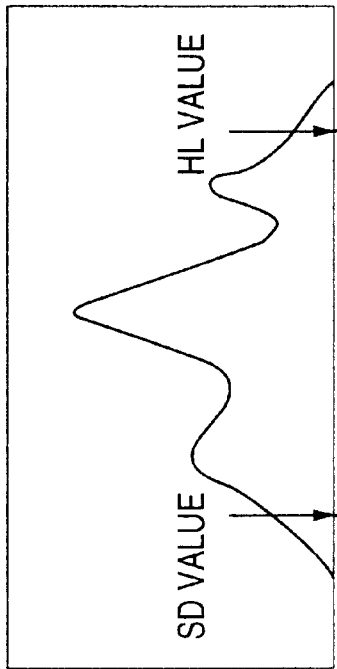
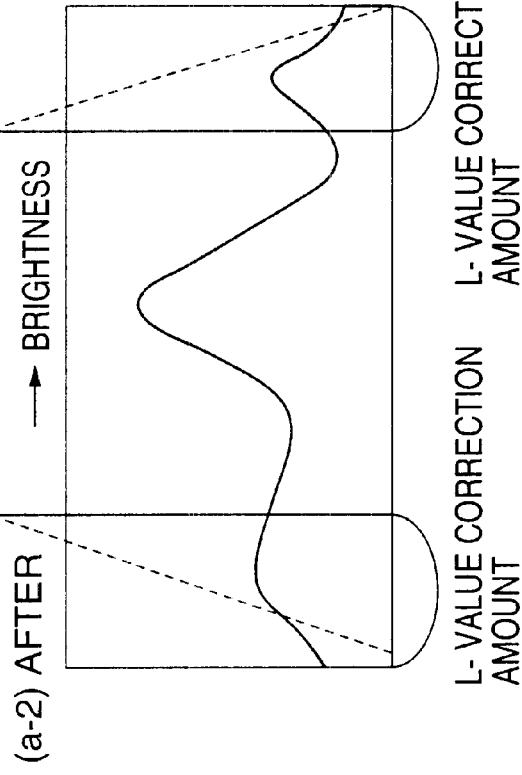

| REPRESENTATIVE HUE ANGLE | ΔH |
|---|---|
| H(M) | ΔH(M) |
| H(R) | ΔH(R) |
| H(Y) | ΔH(Y) |
| H(G) | ΔH(G) |
| H(C) | ΔH(C) |
| H(B) | ΔH(B) |

IMAGE PROCESSING APPARATUS, METHOD FOR PROCESSING AND IMAGE AND COMPUTER-READABLE RECORDING MEDIUM FOR CAUSING A COMPUTER TO PROCESS IMAGES

BACKGROUND OF THE INVENTION

1. Field of the Invention

The present invention generally relates to image processing apparatuses, methods for processing an image and computer-readable recording media for causing a computer to process images, and more particularly to an image processing apparatus, a method for processing an image and a computer-readable recording medium for causing a computer to process images which are capable of processing an image automatically with a high degree of accuracy and eliminating image noises.

In the newspaper industry or the like industry, it is required to process images. In image processing, a special image processing technology, for example, an image correction technology, is needed but the operation for the image correction is not easy and generally only a specialist can carry out the operation.

Accordingly, the auto image processing technology with high accuracy is desired.

2. Description of the Related Art

Conventionally, several processes are conducted for an image. A white balance correction is processed to correct colors that are used for the entire image and cause an improperly white balanced image. A contrast expansion is processed to enlarge a brightness range. A leveling is processed to make uniform a brightness of the entire image in order to provide it with clear contrast. A γ-conversion is processed to adjust a brightness in a dark region in order to provide it with clear contrast.

In addition, a saturation intensity and a hue intensity are processed for an image.

In conventional image processing, specialists determine each correction degree based on their knowledge while they process an image. That is, conventionally, the specialists determine each correction degree while they display the image on a display unit or print out the image on a sheet.

Moreover, a highlight value defined as the brightest value in the image and a shadow value defined as the darkest value in the image are detected. In the conventional image processing, the brightest value in the image is mechanically detected for the highlight value and the darkest value in the image is mechanically detected for the shadow value.

However, in the conventional image processing, the specialists have to indicate the correction degree for the conspicuous color correction or the gradation correction while they display the image on the display unit. Disadvantageously, the conventional image processing is limited to the specialist. Thus, the specialists have to carry out several complicated procedures and operations.

Furthermore, in conventional image processing, since the brightest value in the image is mechanically detected for the highlight value and the darkest value in the image is mechanically detected for the shadow value, noises existing in the image affect the detection so that it is difficult to detect an accurate highlight value and an accurate shadow value.

Consequently, the conventional image processing can not achieve the highly accurate highlight value and the highly accurate shadow value.

SUMMARY OF THE INVENTION

It is a general object of the present invention to provide an image processing apparatus, a method for processing an image and a computer-readable recording medium for causing a computer to process images in which the above-mentioned problems are eliminated.

A more specific object of the present invention is to provide the image processing apparatus, the method for processing an image and the computer-readable recording medium for causing a computer to process an image which are capable of processing an image automatically with high accuracy and eliminating image noises.

The above objects of the present invention are achieved by an image processing apparatus for processing an image, including: a color space transforming part transforming an input color space of an input image to a process color space of a processing image having pixels having a luminance value; a HL/SD values detecting part detecting a HL value that shows a brightest luminance value of the pixels of the processing image and an SD value that shows a darkest luminance value of the pixels of the processing image; a white balance correcting part correcting an improper white balance of the processing image; a gradation correcting part correcting a luminance gradation of the processing image based on a gradation correction line; a leveling part leveling a luminance distribution of the processing image based on variances and leveling rates of the processing image; and a γ-converting part converting a luminance average of the processing image to a γ-value and correcting the luminance of the processing image based on the γ-value, thereby eliminating image noises.

According to the present invention, the image processing apparatus makes it possible to process an image automatically with a high accuracy and eliminate image noises effectively, instead of using specialists.

Also, the above objects of the present invention are achieved by a method for processing an image including the steps of: (a) transforming an input color space of an input image to a process color space of a processing image having pixels having a luminance value; (b) detecting a HL value that shows a brightest luminance value of the pixels of the processing image and an SD value that shows a darkest luminance value of the pixels of the processing image; (c) correcting an improper white balance of the processing image; (d) correcting a luminance gradation of the processing image based on a gradation correction line; (e) leveling a luminance distribution of the processing image based on variances and leveling rates of the processing image; and (f) converting a luminance average of the processing image to a γ-value and correcting the luminance of the processing image based on the γ-value, thereby eliminating image noises.

According to the present invention, it is possible to provide the method for processing an image that can process an image automatically with a high accuracy and eliminate image noises effectively, instead of using specialists.

Furthermore, the above objects of the present invention are achieved by a computer-readable recording medium recorded with program code for causing a computer to process an image, said program comprising the code for: (a) transforming an input color space of an input image to a process color space of a processing image having pixels having a luminance value; (b) detecting a HL value that shows a brightest luminance value of the pixels of the processing image and an SD value that shows a darkest luminance value of the pixels of the processing image; (c)

correcting an improper white balance of the processing image; (d) correcting a luminance gradation of the processing image based on a gradation correction line; (e) leveling a luminance distribution of the processing image based on variances and leveling rates of the processing image; and (f) converting a luminance average of the processing image to a γ-value and correcting the luminance of the processing image based on the γ-value, thereby eliminating image noises.

According to the present invention, it is possible to provide the computer-readable recording medium recorded with program code for causing a computer to process an image that can process an image automatically with a high accuracy and eliminate image noises effectively, instead of using specialists.

BRIEF DESCRIPTION OF THE DRAWINGS

Other objects, features and advantages of the present invention will become more apparent from the following detailed description when read in conjunction with the accompanying drawings, in which:

FIGS. 20A and 20B are diagrams showing luminance histograms for another gradation process according to the present invention;

DESCRIPTION OF THE PREFERRED EMBODIMENTS

Figure 1:
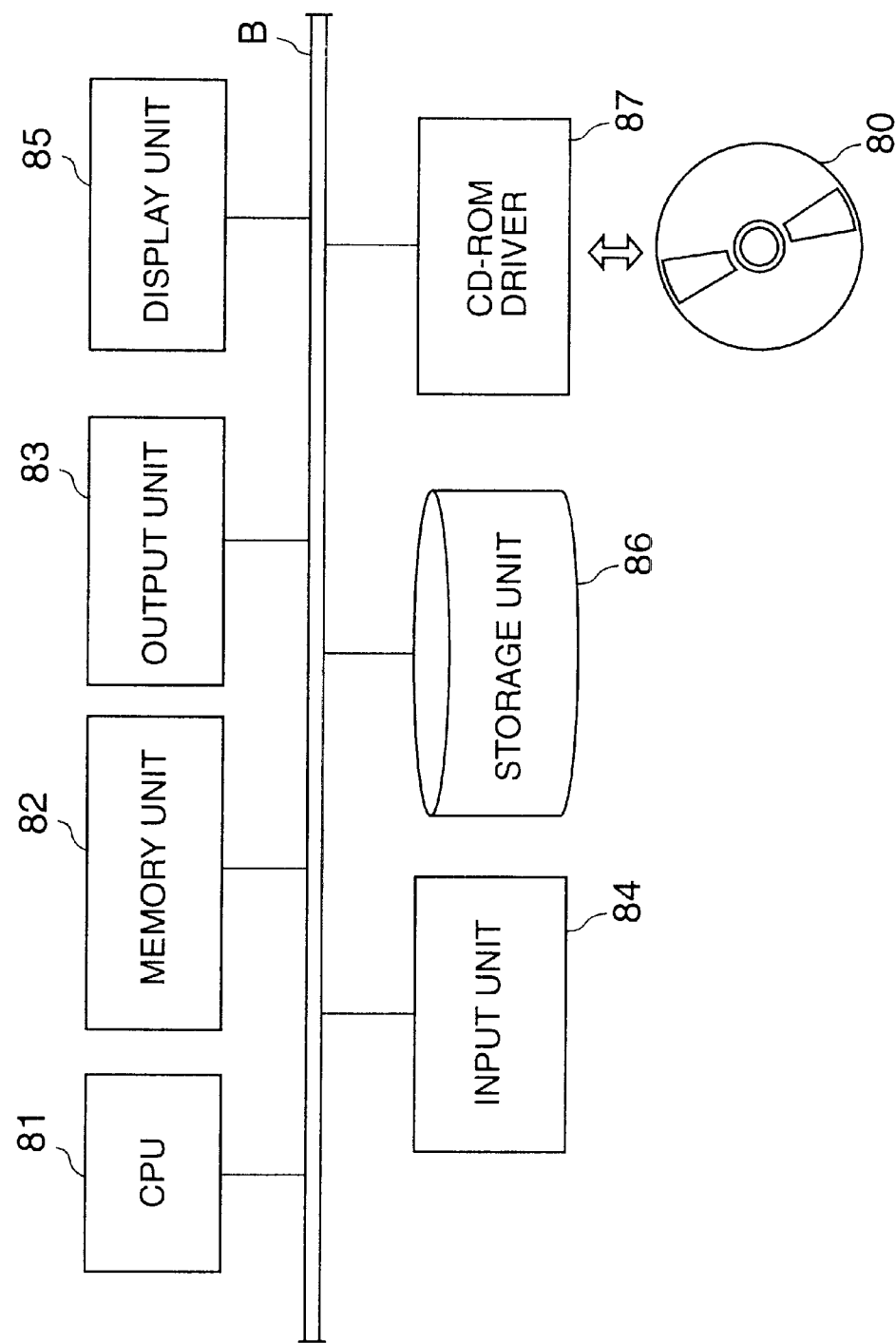
FIG. 1 is a diagram showing a hardware configuration according to an embodiment of the present invention.

An image processing apparatus has a hardware configuration such as shown in FIG. 1.

In FIG. 1, the image processing apparatus includes a CPU 81, a memory unit 82, an output unit 83, an input unit 84, a display unit 85, a storage unit 86 and a CD-ROM driver 87 which are mutually connected by a bus. The CPU 81 controls the entire system in accordance with a program resident in the memory unit 82. In addition, the CPU 81 executes processes concerning the image processing apparatus that will be described later. The memory unit 82 includes ROM and RAM. Also, the memory unit 82 temporarily stores programs, tables, various data and the like during the execution of the processes. The input unit 84 includes a keyboard and a mouse for a user to input information into the system, but is not limited to only these input devices.

The display unit 85 displays image information or the like while an image is processed. The output unit 83 outputs data from the memory unit 82 as directed by an output instruction of the CPU 81 based on a user operation from the input unit 84.

The storage unit 86 includes a hard disk unit and stores various files and programs. In accordance with instructions from the CPU 81, the CD-ROM driver 87 reads information from the CD-ROM 80 set in the CD-ROM driver 87 and then provides the information to the storage unit 86. For example, programs realizing processes concerning the above-mentioned image processing apparatus are provided by the CD-ROM 80. That is, programs read from the CD-ROM 80 are installed into the storage unit 86 through the CD-ROM driver 87. It should be noted that a recording medium is not limited to a CD-ROM, but other computer-readable recording media such as a magnetic disk, a magnetic tape, an optical disk, a magneto optical disk, a semiconductor memory or the like may be used.

Figure 2:
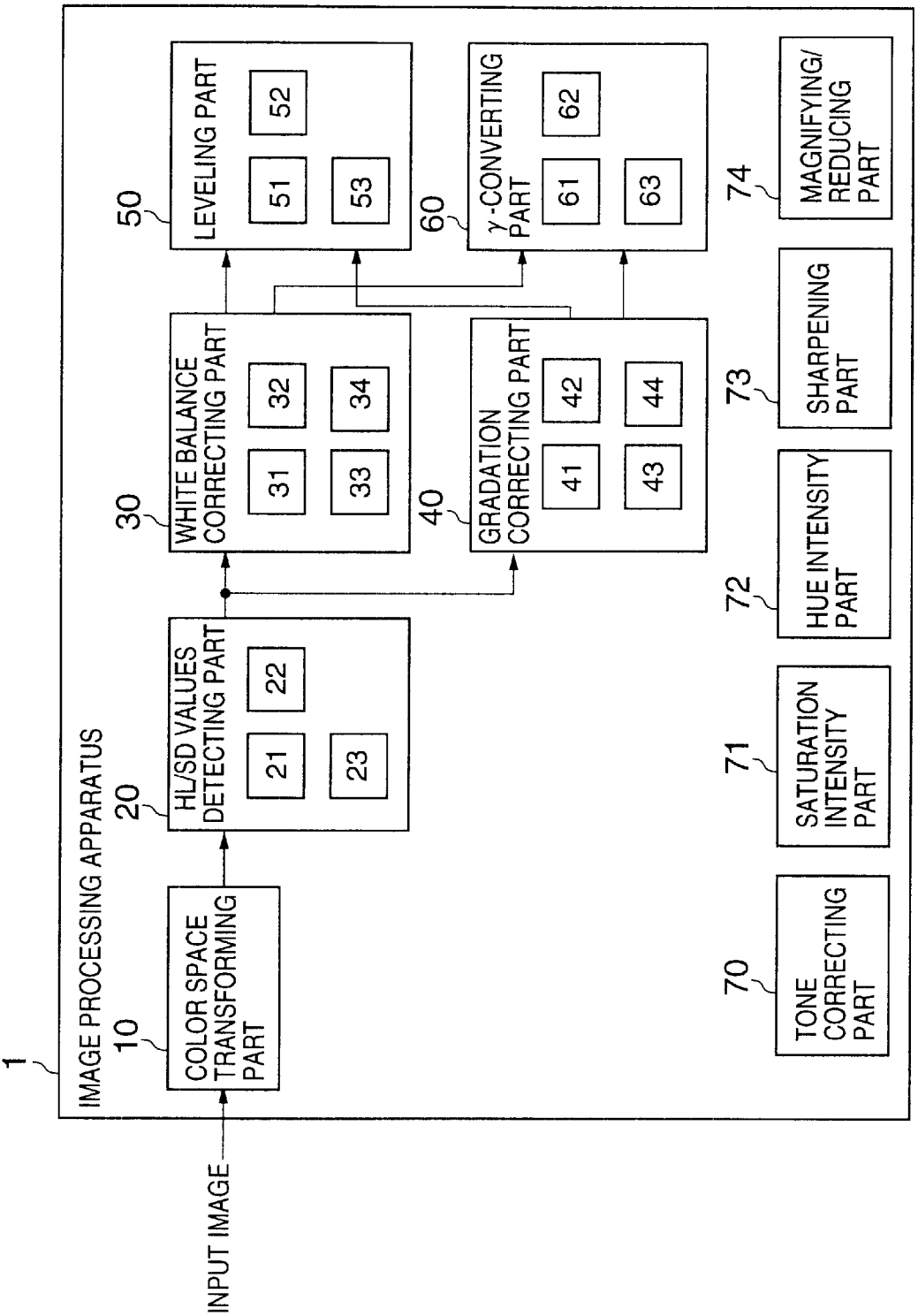
FIG. 2 is a block diagram showing a principal configuration of an image processing apparatus according to the present invention.

FIG. 2 is a diagram showing a principal configuration of an image processing apparatus according to an embodiment of the present invention.

In the FIG. 2, an image processing apparatus 1 includes a color space transforming part 10, a HL/SD values detecting part 20, a white balance correcting part 30, a gradation correcting part 40, a leveling part 50, a γ-converting part 60, a tone correcting part 70, a saturation intensity part 71, a hue intensity part 72, a sharpening part 73 and a magnifying/reducing part 74.

The color space transforming part 10 transforms an input image into a color space having a luminance component and a chromatic component.

The HL/SD values detecting part 20 detects a highlight value and a shadow value of a processing image and includes an obtaining part 21 for obtaining a plurality of pixels having possible highlight (HL) values and pixels having possible shadow (SD) values, a calculating part 22 for calculating an average of a brightness of obtained possible pixels and a brightness of neighbor pixels and a determining part 23 for determining a highlight value and a shadow value based on the averages.

The white balance correcting part 30 corrects conspicuous colors of the processing image and includes a detecting part 31 (that may be the HL/SD values detecting part 20) for detecting the highlight value of the processing image, an obtaining part 32 for obtaining pixels having a brightness in the same brightness range where the detected highlight value is specified, a calculating part 33 for calculating a correction line that shows a relationship between the chromatic component and the luminance component and a correcting part 34 for correcting the chromatic component of pixels in the processing image based on the calculated correction line and an ideal line.

The gradation correcting part 40 corrects the gradation of the processing image and includes a detecting part 41 (that may be the HL/SD values detecting part 20) for detecting the highlight value of the processing image, a calculating part 42 for calculating a reference value for the gradation correction, a determining part 43 for determining a correction curve indicated by a quadratic curve when an input variable denotes a brightness degree and an output variable denotes a brightness correction degree based on a maximum brightness, the calculated reference value and the detected highlight value, and also determining another correction curve indicated by another quadratic curve when an input variable denotes a brightness degree and an output variable denotes a brightness correction degree based on a minimum brightness, the calculated reference value and the detected shadow value, and a correcting part 44 for correcting the brightness of pixels in the processing image based on the determined correction curves.

The leveling part 50 levels a brightness distribution in the processing image and includes a calculating part 51 for calculating brightness variance of pixels in the processing image, a determining part 52 for determining a level rate indicated by the calculated brightness dispersion and a correcting part 53 for averaging the brightness of pixels in the processing image based on the determined level rate.

The γ-converting part 60 processes the γ-conversion for the brightness of the processing image and includes a calculating part 61 for calculating an average of the brightness of pixels in the processing image, a determining part 62 for determining a γ-value indicated by the calculated average by using a correction line in which an input variable denotes an average and an output variable denotes the γ-value and a correcting part 63 for processing the γ-conversion based on the determined γ-value.

The tone correcting part 70 corrects the brightness of a processing pixel by using a tone curve converting an input brightness into an output brightness. The tone curve may be provided by table data or a calculation.

The saturation intensity part 71 intensifies the saturation of the processing image based on the maximum saturation of the processing image and a logical saturation upper limit or a saturation upper limit that is capable of being set.

The hue intensity part 72 intensifies the hue of the processing image by using hue data showing a relationship between an input hue and an output hue. The hue data may be provided by table data or a calculation.

The sharpening part 73 sharpens the processing image and includes a generating part (not shown) for generating a derivative image of the processing image, an obtaining part (not shown) for obtaining pixels to be sharpened and a correcting part (not shown) for correcting the brightness of the obtained pixels.

When an image size change request is conducted, the magnifying/reducing part 74 determines whether the image size change request is a magnify request or a reduce request. The magnifying/reducing part 74 includes a determining part (not shown) for determining whether or not a magnification indicated by the image size change request exceeds a predetermined possible magnification when the image size change request is the magnify request, a first calculating part (not shown) for calculating the brightness of non-grating pixels that are not grating pixels in accordance with a first compensation algorithm wherein process speed is given first priority when it is determined that the image size change request is a reduce request or when the magnification indicated by the image size change request is less than the predetermined possible magnification, and a second calculating part (not shown) for calculating the brightness of the non-grating pixels in accordance with a second compensation algorithm wherein accuracy is given first priority when the magnification indicated by the image size change request exceeds the predetermined possible magnification. Accordingly, the magnifying/reducing part 74 changes the size of the processing image but calculates the chromatic component of the non-grating pixels.

In the HL/SD values detecting part 20 according to the present invention as configured above, the obtaining part 21 obtains a plurality of the pixels having possible highlight (HL) values and a plurality of the pixels having possible shadow (SD) values based on the brightness of the pixels in the processing image. In response to the process by the obtaining part 21, the calculating part 22 calculates an average of the brightness of each obtained possible pixel and the brightness of neighbor pixels within a vicinity of the obtained possible pixel.

After that, the determining part 23 specifies the maximum of the calculated averages and determines the maximum average as a highlight value of the processing image. The determining part 23 also determines the minimum of the calculated averages and determines the minimum average as a shadow value.

As mentioned above, the HL/SD values detecting part 20 according to the present invention can correct noise effects existing in the processing image and can detect an accurate highlight value and an accurate shadow value.

In addition, in the white balance correcting part 30 according to the present invention, the detecting part 31 detects the highlight value from the brightness of pixels in the processing image. Subsequently, the obtaining part 32 obtains pixels having a brightness in the same brightness range where the detected highlight value is specified.

After that, the calculating part 33 calculates a correction line showing a relationship between the chromatic component and the luminance component. The correcting part 34 corrects the chromatic component of pixels in the processing image based on the calculated correction line and an ideal line showing a ideal relationship between the chromatic component and the luminance component.

According to the white balance correcting part 30, it is possible to properly correct the white balance in the processing image, instead of the manual white balance correction by a specialist.

Moreover, in the gradation correcting part 40 according to the present invention, the detecting part 41 detects the highlight value and the shadow value from the brightness of pixels in the processing image and then the calculating part 42 calculates the reference value for the gradation correction.

The determining part 43 determines the correction curve indicated by the quadratic curve when an input variable denotes a brightness degree and an output variable denotes a brightness correction degree based on a maximum brightness, the calculated reference value and the detected highlight value. The determining part 43 further determines another correction curve indicated by another quadratic curve when an input variable denotes a brightness degree and an output variable denotes a brightness correction degree based on a minimum brightness, the calculated reference value and the detected shadow value. Thereafter, the correcting part 44 corrects the brightness of pixels in the processing image based on the determined correction curves.

According to the gradation correcting part 40, it is possible to correct the gradient of the processing image, instead of the manual gradation correction by the specialist.

In the leveling part 50, the calculating part 51 calculates the brightness distribution of pixels in the processing image, or calculates a difference between the calculated brightness distribution and a brightness distribution of pixels in the original input image and calculates a corrected distribution based on the difference.

Subsequently, the determining part 52 determines the level rate indicated by a brightness dispersion, which is calculated by using a correction line expressed where a distribution is an input variable and a level rate is an output variable inversely proportional to the distribution. After that, the correcting part 53 corrects the brightness by averaging the brightness of pixels in the processing image based on the determined the level rate.

According to the leveling part 50, it is possible to average the brightness distribution of the processing image, instead of the manual process by the specialist.

In the γ-converting part 60 according to the present invention, the calculating part 61 calculates a brightness average of pixels in the processing image or calculates a difference between the calculated brightness average and an original brightness average of pixels in the original input image and calculates a corrected brightness average based on the difference.

Subsequently, the determining part 62 determines a γ-value indicated by the corrected brightness average, by using a correction line expressed where the corrected brightness average is an input variable and the γ-value is an output variable being closer to '1' depending on the corrected brightness average being brighter value. Accordingly, the correcting part 63 processes the γ-conversion based on the determined γ-value to correct the brightness of the processing image.

According to the γ-converting part 60, it is possible to correct the brightness of the processing image by the γ-conversion, instead of the manual process by the specialist.

Figure 3:
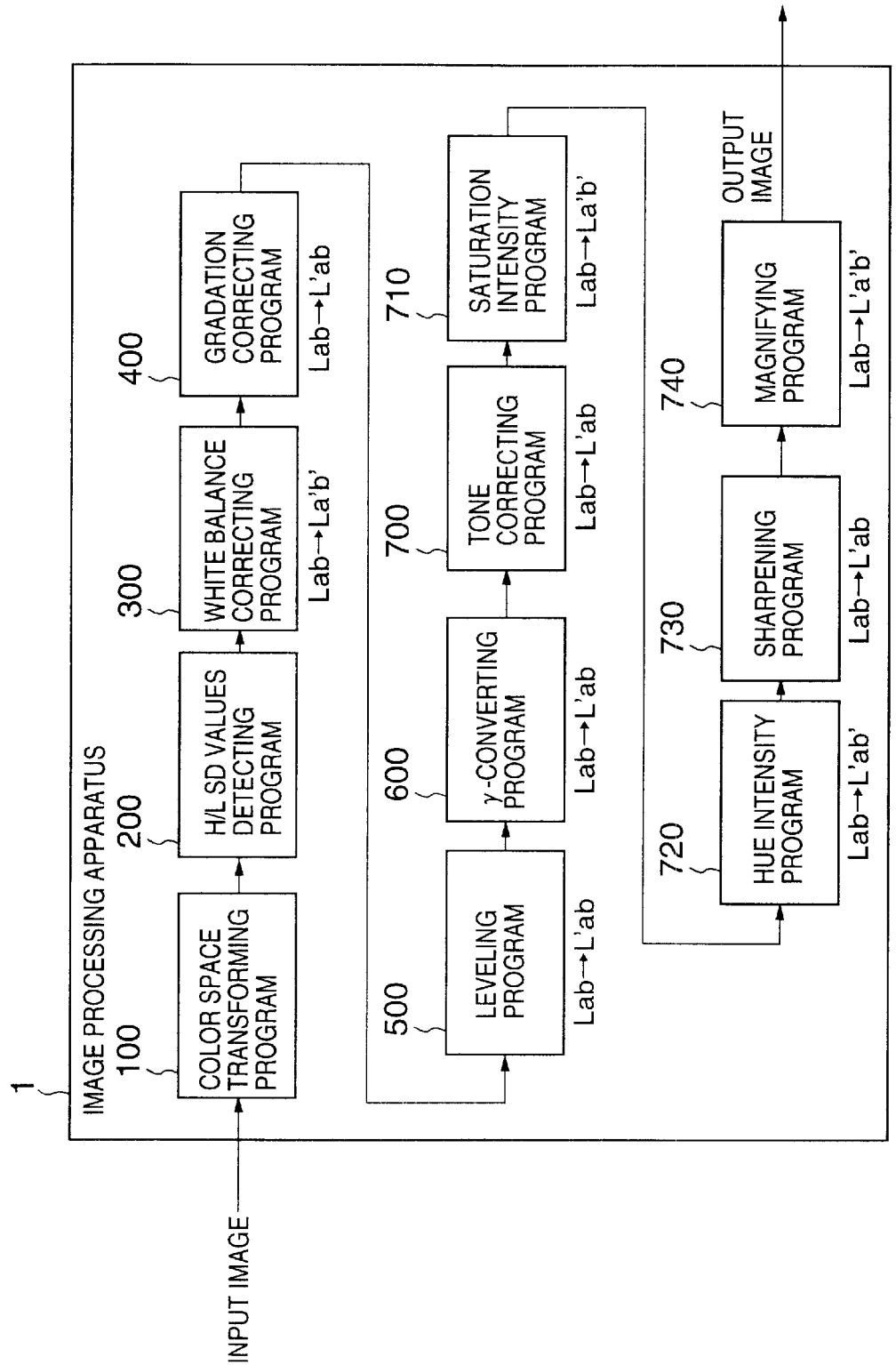
FIG. 3 is a block diagram showing a program configuration of the image processing apparatus according to the present invention.

FIG. 3 is a diagram showing a program configuration of the image processing apparatus according to the embodiment of the present invention.

In the FIG. 3, in order to realize the principal configuration in FIG. 2, the image processing apparatus 1 includes a color space transforming program 100 corresponding to the color space transforming part 10, a HL/SD values detecting program 200 corresponding to the HL/SD values detecting part 20, a white balance correcting program 300 corresponding to the white balance correcting part 30, a gradation correcting program 400 corresponding to the gradation correcting part 40, a leveling program 500 corresponding to the leveling part 50, a γ-converting program 600 corresponding to the γ-converting part 60, a tone correcting program 700 corresponding to the tone correcting part 70, a saturation intensity program 710 corresponding to the saturation intensity part 71, a hue intensity program 720 corresponding to the hue intensity part 72, a sharpening program 730 corresponding to the sharpening part 73 and a magnifying/reducing program 740 corresponding to the magnifying/reducing part 74.

The above programs may be stored in a CD-ROM 80 in FIG. 1 installed into the image processing apparatus 1, and then loaded in memory unit 82.

The above programs are executed by the CPU 81 in FIG. 1.

Figures 4A, 4B:
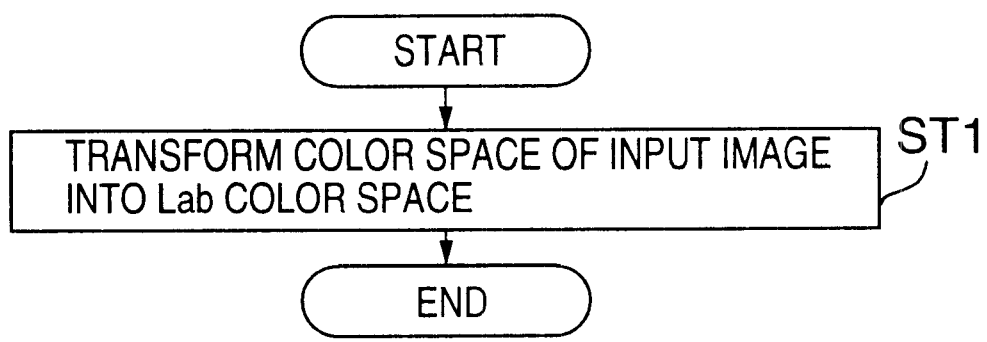
FIGS. 4A and 4B are diagrams for explaining color space transforming process according to the present invention.

A process executed by the color space transforming program 100 will now be described with reference to FIGS. 4A and 4B. FIG. 4A is a flowchart for explaining a process executed by the color space transforming program 100 and FIG. 4B is a diagram showing a transforming matrix used by the color space transforming program 100.

When an image is input to the image processing apparatus 1, the color space transforming program 100 transforms a color space of the input image into a Lab color space. That is, for example, when an image used by a CMY color space is input, the CMY color space is transformed into the Lab color space, which generates two chromatic components a and b and a luminance component L, as shown in the flowchart in FIG. 4A.

The color space transforming process is a matrix operation shown in FIG. 4B.

Figure 5:
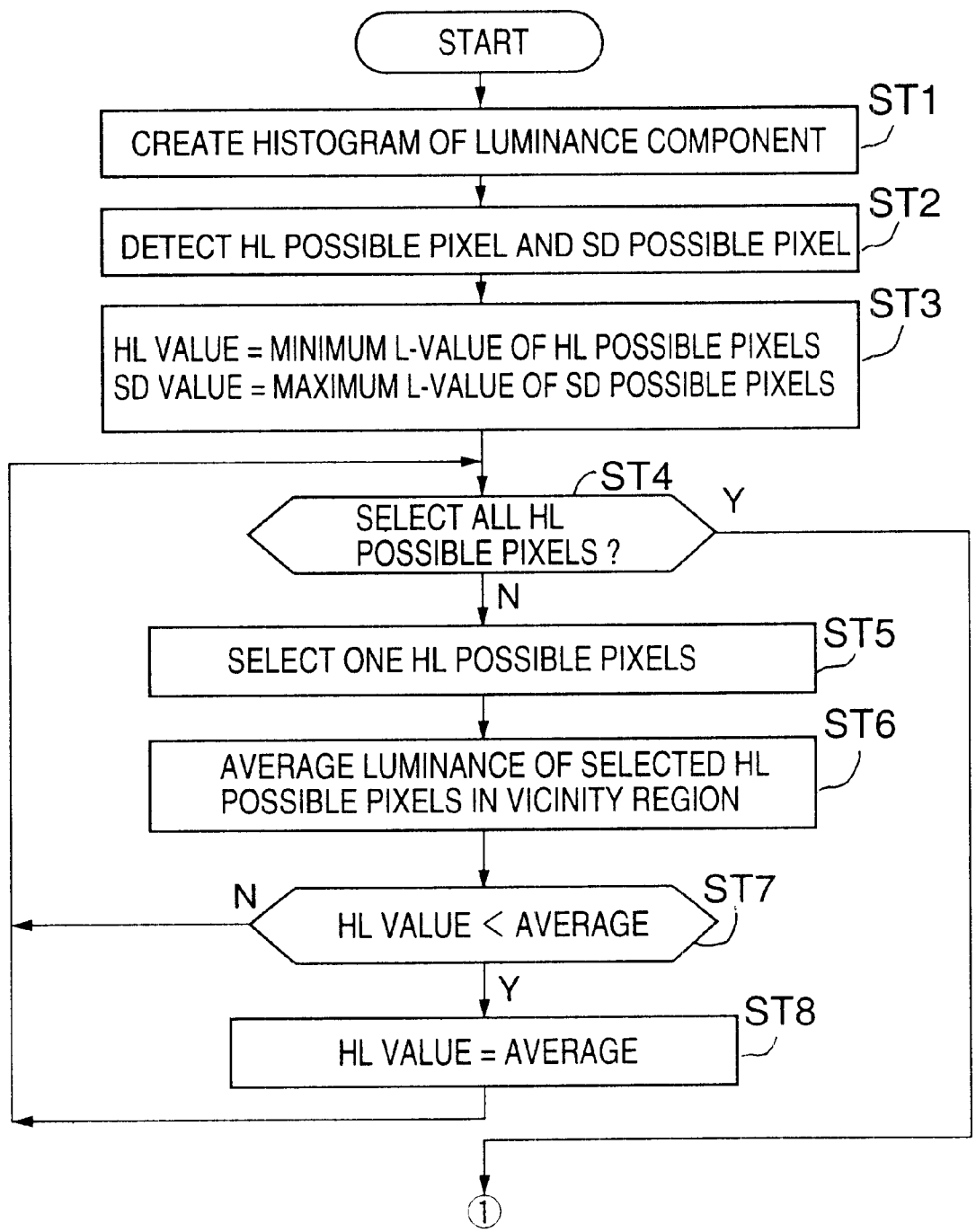
FIG. 5 is a flowchart for explaining the HL/SD values detecting process according to the present invention.
Figure 6:
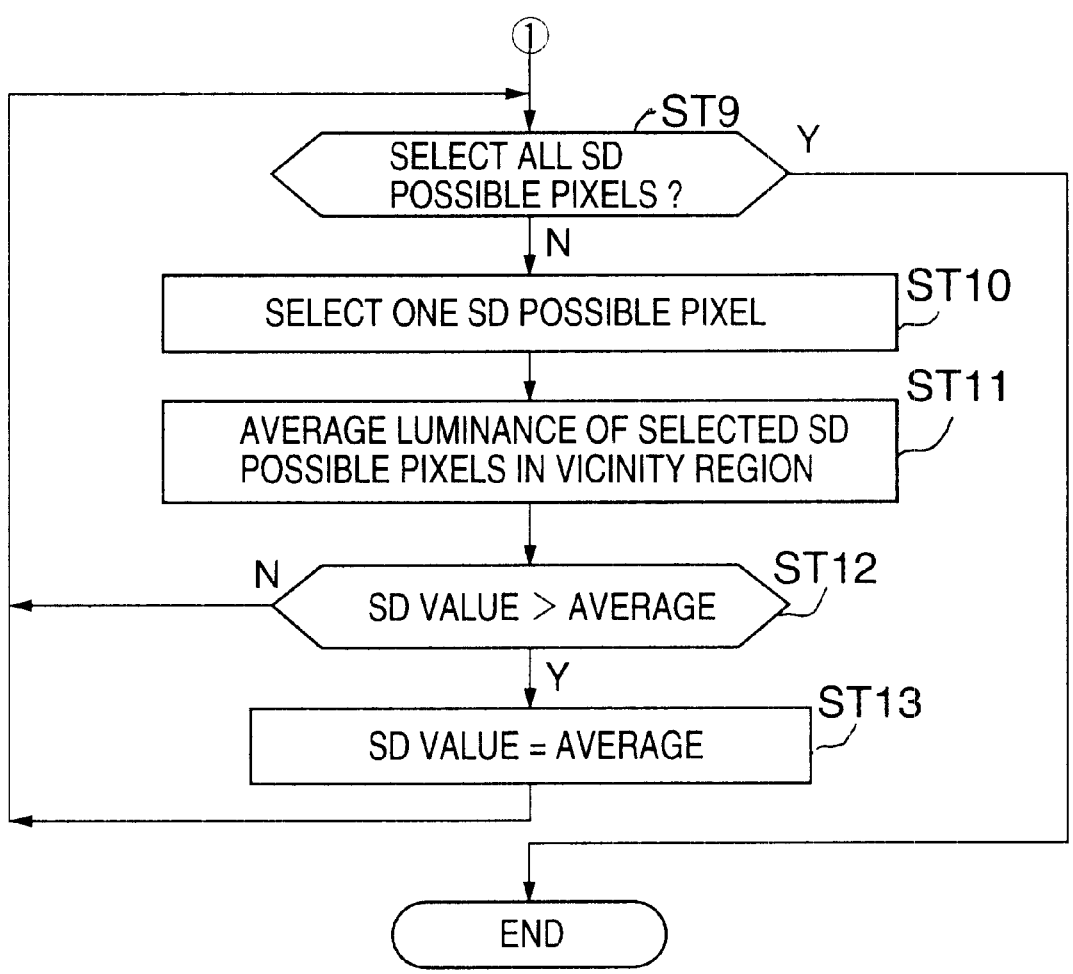
FIG. 6 is a flowchart for explaining a HL/SD values detecting process according to the present invention.

The HL/SD values detecting program 200 will now be described. FIG. 5 and FIG. 6 are flowcharts for explaining a process executed by the HL/SD values detecting program 200.

Figure 17A:
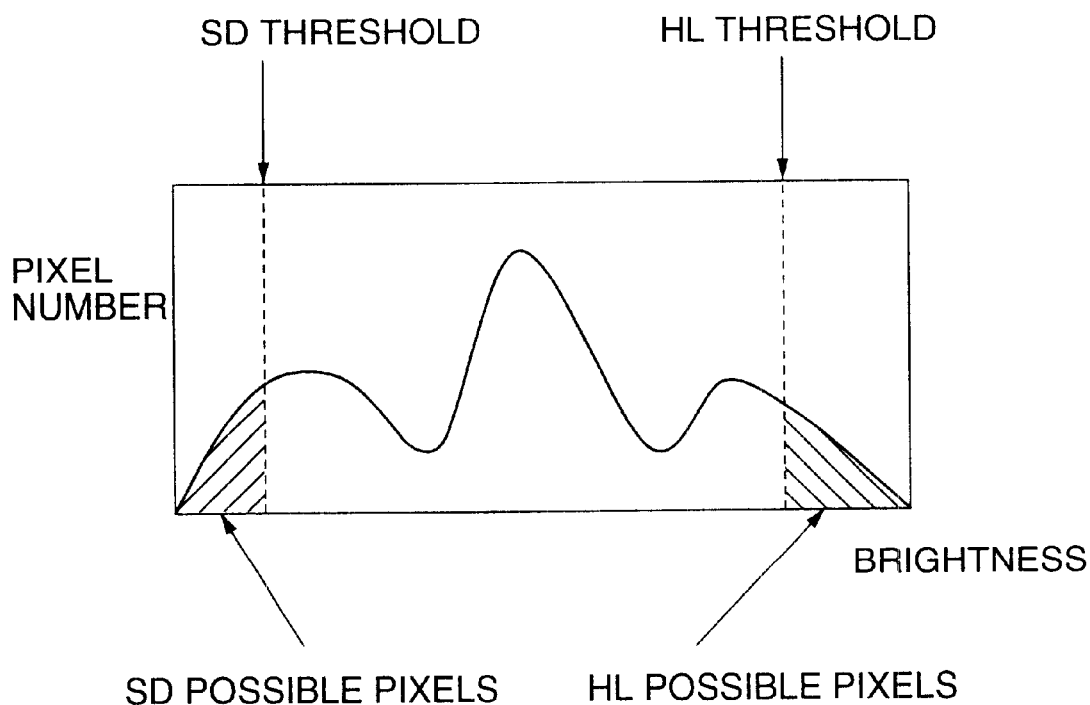
FIGS. 17A and 17B are diagrams for explaining a HL/SD values detecting process according to the present invention.

Referring to the FIG. 5 and FIG. 6, when the HL/SD values detecting program 200 receives the input image of the LAB color space that is output from the color space transforming program 100, the HL/SD values detecting program 200 creates a histogram of the luminance component (L-value) of the input image in step ST1. That is, a histogram shown in FIG. 17A is created by counting pixels corresponding to each L-value.

In step ST2, for example, pixels are detected as a HL possible pixel having a HL value when the L-values of the pixels are larger than a defined HL threshold. Also, pixels are detected as an SD possible pixel having an SD value when the l-values of the pixels are smaller than a defined SD threshold. That is, the HL possible pixels and the SD possible pixels are detected in two regions shown by oblique lines.

In step ST3, a minimum L-value (that is, the HL threshold) of the HL possible pixels is set as an initial value of the HL value and a maximum L-value (that is, the SD threshold) of the SD possible pixels is set as an initial value of the SD value.

In step ST4, it is determined whether or not all HL possible pixels are selected. When it is determined that all HL possible pixels are not selected, the process goes to step ST5. One of unselected HL possible pixels is selected in the step ST5.

Figure 17B:
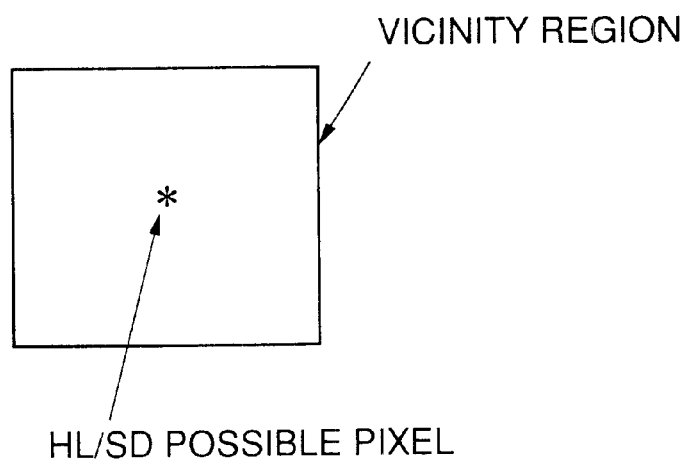

In step ST6, an average of the L-values is calculated by averaging the L-values of the selected HL possible pixel and the HL possible pixels located within a predetermined vicinity region. That is, as shown in FIG. 17B, the vicinity region is defined, for example, as a 40×40 pixel block when a 240 dpi resolution is used or a 100×100 pixel block when a 600 dpi resolution is used. The average of the L-values of pixels within the defined vicinity region is calculated.

In step ST7, the HL value set in the step ST3 or step ST8 is compared to the calculated average. When it is determined that the calculated average is greater than the HL value, the process goes to the step ST8. The calculated average is set as a new HL value in the step ST8 and the process goes to the step ST4.

When it is determined in the step ST4 that all HL possible pixels are selected, the process goes to step ST9 shown in FIG. 6. It is determined whether or not all SD possible pixels are selected in the step ST9. When it is determined that all SD possible pixels are not selected, the process goes to step ST10. One of unselected SD possible pixels is selected in the step ST10.

In step ST11, an average of the L-values is calculated by averaging the L-values of the selected SD possible pixel and the SD possible pixels located within a predetermined vicinity region. That is, as shown in FIG. 17B, the vicinity region is defined and the average of the L-values of pixels within the defined vicinity region is taken.

In step ST12, the SD value set in the step ST3 or step ST13 is compared to the calculated average. When it is determined that the calculated average is smaller than the SD value, the process goes to the step ST13. The calculated average is set as a new SD value in the step ST13 and the process goes to the step ST9.

In the step ST9, when it is determined that all of the SD possible pixels are selected, that is, the HL value and the SD value are detected, the process executed by the HL/SD values detecting program is terminated.

As described above, the HL/SD values detecting program 200 calculates the L-value average of pixels located within the vicinity regions of a plurality of possible pixels having the HL value and determines the largest L-value average in the pixels as the HL value. Therefore, it is possible to prevent the noise effects present in the input image and to detect the HL value. The HL/SD values detecting program 200 calculates the L-value average of pixels located within the vicinity regions of a plurality of possible pixels having the SD value and determines the smallest L-value average in the pixels as the SD value. Therefore, it is possible to prevent the noise effects present in the input image and to detect the SD value.

In this process, the HL threshold for detecting the HL possible pixels is set to, for example, the L-value when the number of pixels achieves a predetermined percentage of the total pixels while being counted from the maximum L-value. The SD threshold for detecting the SD possible pixels is set to, for example, the L-value when the number of pixels achieves a predetermined percentage of the total pixels while being counted from the minimum L-value.

Figure 7:
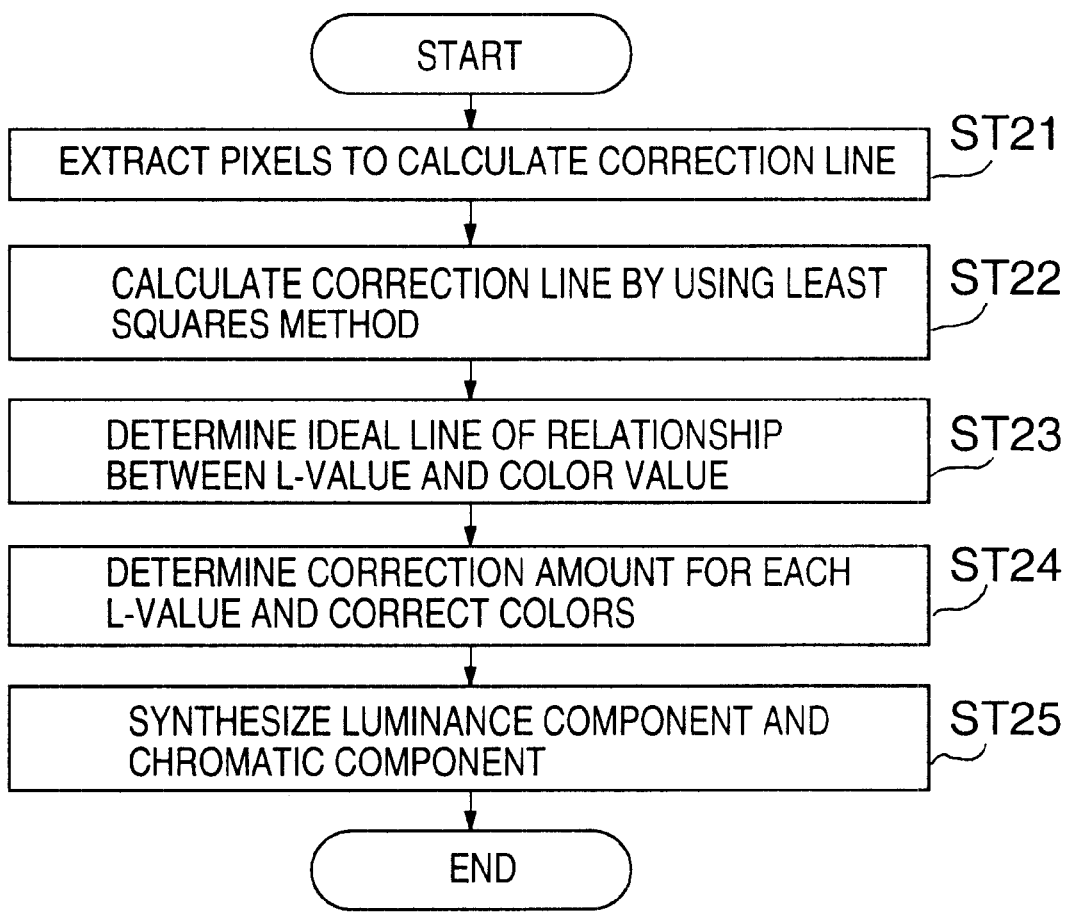
FIG. 7 is a flowchart for explaining a white balance correcting process according to the present invention.

A process executed by the white balance correcting program 300 will now be described. FIG. 7 is a flowchart for explaining the process executed by the white balance correcting program 300.

The white balance correcting program 300 corrects an a-value of the chromatic component a and a b-value of the chromatic component b in the processing image so that the white colors of the processing image obtain a balanced tint.

In step ST21, when the white balance correcting program 300 is executed, the white balance correcting program 300 extracts pixels from the processing image output from the color space transforming program 100 within a predetermined L-value range including the HL values obtained by the HL/SD values detecting program 200. The pixels are extracted from the predetermined L-value range limited by correction lines.

Figure 18A:
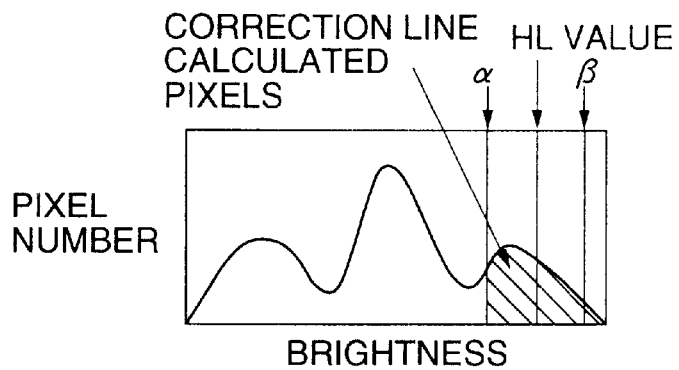
FIGS. 18A, 18B and 18C are diagrams for explaining a white balance process according to the present invention.

That is, the pixels having the L-value are extracted between a value $\alpha$ being a predetermined value smaller than the HL value (HL value$-\alpha$) and a value $\beta$ being another predetermined value larger than the HL value (HL value$+\beta$), as shown in FIG. 18A.

In step ST22, one correction line, which expresses a relationship between the L-value and the a-value of the extracted pixels, is calculated by using the least squares method. Also, another correction line, which expresses a relationship between the L-value and the b-value of the extracted pixels, is calculated by using the least squares method.

Figure 18B:
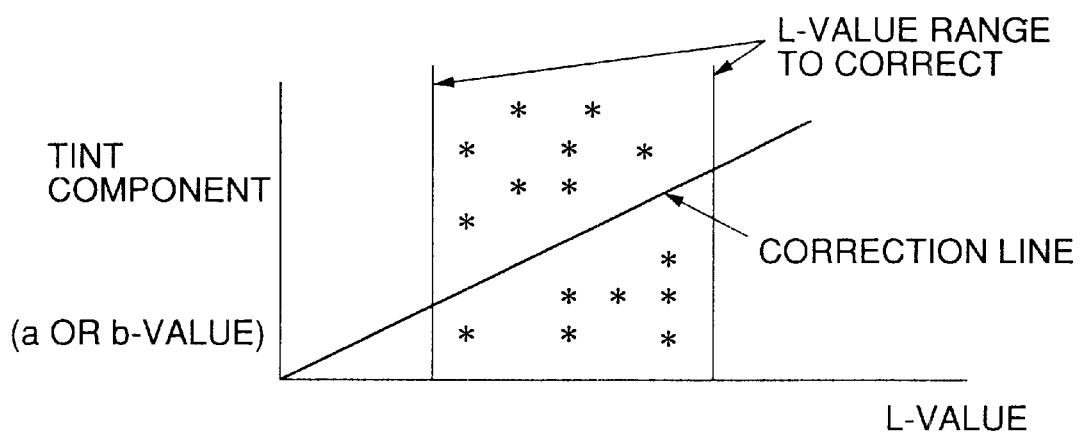

That is, as shown in FIG. 18B, by using the least squares method based on the pixels extracted in the step ST21, the correction line expressing the relationship between the L-value and the a-value and the correction line expressing the relationship between the L-value and the b-value are calculated.

In step ST23, one ideal line expressing the relationship between the L-value and the a-value and another ideal line expressing the relationship between the L-value and the b-value are defined, interactively with the user.

In step ST24, for each L-value, a correction amount of the a-value is determined as a difference value between the correction line and the ideal line. Another correction amount of the b-value is also determined as another difference value in the same manner. Based on the two difference values, the a-value and the b-value of each pixel in the processing image transformed by the color space transforming program 100 are corrected.

Figure 18C:
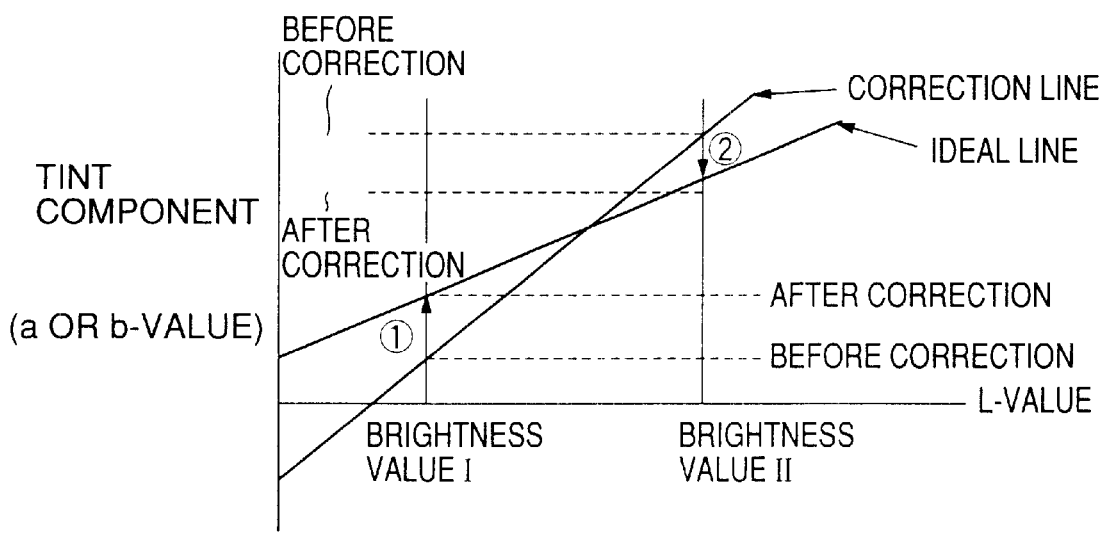

As shown in FIG. 18C, the difference value for the a-value is calculated by specifying the a-value on the correction line and the a-value on the ideal line at the L-value within the range between the HL value$-\alpha$ and the HL value$+\beta$. The a-value of the pixel at the L-value is added or subtracted by the difference value. The b-value of the pixel at the L-value is also obtained in the same manner as the a-value.

Thereafter, in step ST25, the luminance component that is not corrected and the two chromatic components (a-value and b-value) are synthesized.

In the white balance correcting program 300, by using bright areas in the processing image where the L-value is larger, one correction line expressing the relationship between the L-value and the a-value and another correction line expressing the relationship between the L-value and the b-value are obtained in accordance with colors in the processing image that are easily found to be objectionable by the eye are in a bright more than a dark area. Based on the difference value between the correction line and the ideal line corresponding thereto, the correction amount of the a-value is determined. The b-value is also determined. Therefore, the white balance correcting program 300 makes it possible to correct the a-value and the b-value of each pixel in the processing image transformed by the color space transforming program 100. Accordingly, the white balance correcting program 300 can realize a white balanced image, instead of using the specialist.

A process executed by the gradation correcting program 400 will now be described.

In the gradation correcting program 400, the L-value is expanded to the entire L-value available range.

Figure 8:
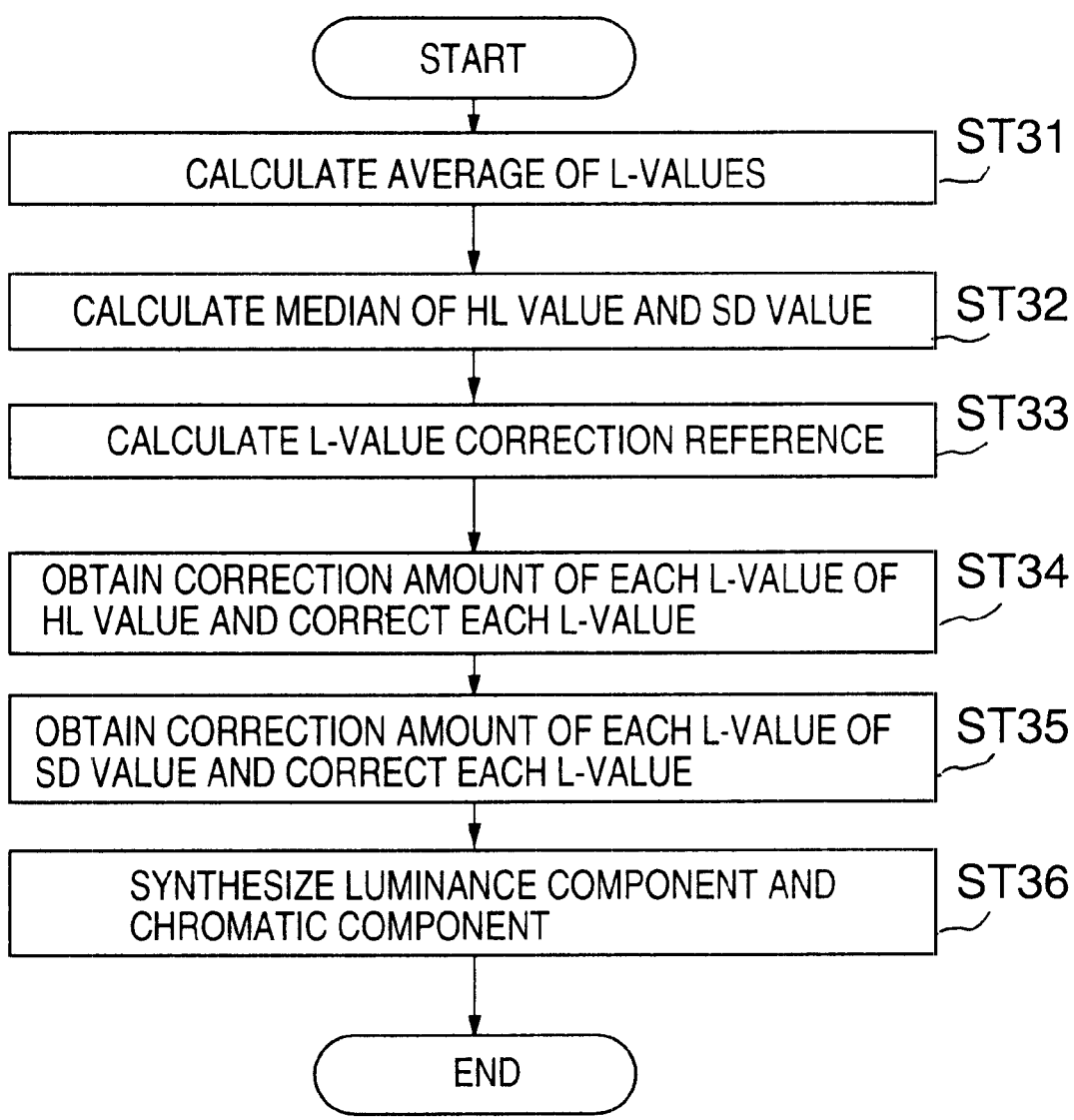
FIG. 8 is a flowchart for explaining a gradation correcting process according to the present invention.

FIG. 8 is a flowchart for explaining a process executed by the gradation correcting program according to the present invention.

When the gradation correcting program 400 is executed, the L-values in the processing image output from the color space transforming program are obtained and averaged in step ST31.

Figure 19A:
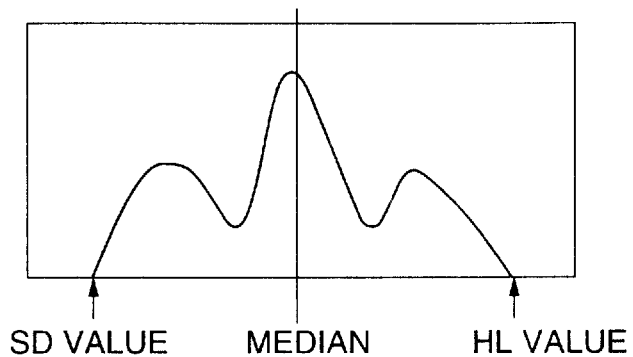
FIGS. 19A, 19B and 19C are diagrams showing luminance histograms for a gradation process according to the present invention.

In step ST32, medians of the HL value and the SD value calculated by the HL/SD values detecting program 200 are calculated. That is, the median is calculated as median=(*HL* value+*SD* value)/2 shown in FIG. 19A.

In step ST33, a L-value correction reference is calculated based on the average of the L-values obtained in the step ST31 and the median obtained in the step ST32. That is, the L-value correction reference value is calculated as

Figure 19B:
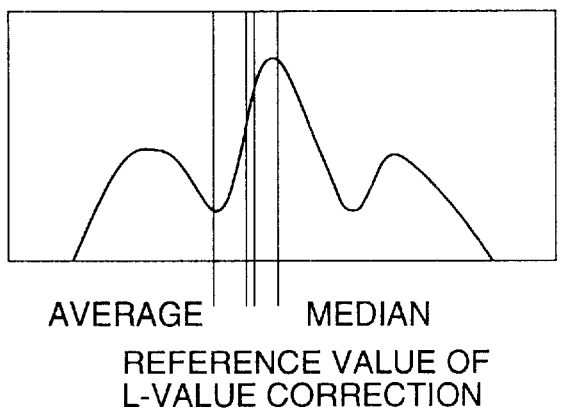

*L*-value correction reference=(*L*-value average+median)/2 shown in FIG. 19B.

In step ST34, a HL correction amount for each L-value of HL values is calculated based on the following expression:

*HL* correction amount=(255−*HL* value)×(*L*-value correction reference−*L*-value)$^2$/(*L*-value correction reference−*HL* value)$^2$ where '225' is the maximum L-value (L-value in white areas).

For example, when the L-value correction reference is '128', the HL value is '200', and the L-value to be corrected is '96', the HL correction amount is '11'. Consequently, the L-value is corrected from '96' to '107'.

Figure 19C:
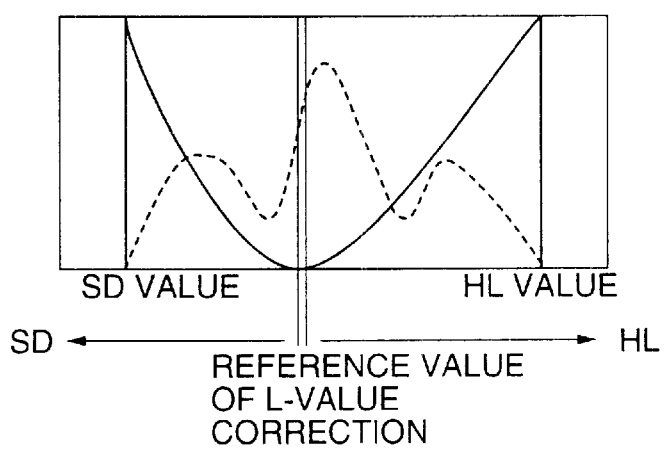

That is, when L-value is equal to the L-value correction reference, the HL correction amount is '0', or when L-value is equal to the HL value, the HL correction amount is '255−HL value' (>0). It should be noted that the HL correction amount is determined in order to shift the HL value toward the maximum L-value '255' but the L-value correction reference is not changed. As shown in FIG. 19C, the HL correction amount is determined in accordance with a quadratic curve such that the HL correction amount is greater when the L-value is closer to the HL value.

In step ST35, an SD correction amount for each L-value of SD values is calculated based on the following expression:

*SD* correction amount=(0−*SD* value)×(*L*-value correction reference−*L*-value )$^2$/(*L*-value correction reference−*SD* value)$^2$ where '0' is the maximum L-value (L-value in white areas).

For example, the L-value correction reference is '128', the SD value is '32', and the L-value to be corrected is '64', the SD correction amount is '−14'. Consequently, the L-value is corrected from '64' to '50'.

That is, when L-value is equal to the L-value correction reference, the SD correction amount is '0', or when L-value is equal to the SD value, the SD correction amount is '0−SD value' (>0). It should be noted that the SD correction amount is determined in order to shift the SD value toward the minimum L-value '0' but the L-value correction reference is not changed. As shown in FIG. 19C, the SD correction amount is determined in accordance with a quadratic curve such that the SD correction amount is smaller when the L-value is closer to the SD value.

In step ST36, the luminance component and the two chromatic components (a-value and b-value) that are not corrected are synthesized. Then, the process executed by the gradation correcting program 400 is terminated.

As described above, the gradation correcting program 400 corrects the gradation of the processing image based on the obtained median of the L-values in the processing image such that the L-value is expanded to the entire L-value available range. Accordingly, in the gradation correcting program 400, brighter areas and darker areas are distinguished more then median brightness areas. That is, the median brightness areas are adjusted by a small correction amount, the brighter areas are adjusted toward the upper limitation of brightness, and the darker areas are adjusted toward the lower limitation of brightness. Therefore, the gradation correcting program 400 makes it possible to prevent from degrading the quality of the processing image and to effectively correct the gradation of the processing image, instead of using the specialist.

According to the present invention, in the HL/SD values detecting program 200, since the HL value is not set as the maximum L-value, the corrected L-value can be greater then the maximum '255'. In this case, the corrected L-value is limited to '255'. Also, since the SD value is not set as the minimum L-value, the corrected L-value can be smaller then the minimum '0'. In this case, the corrected L-value is limited to '0'.

Alternatively, another process for correcting gradation is provided.

Figure 9:
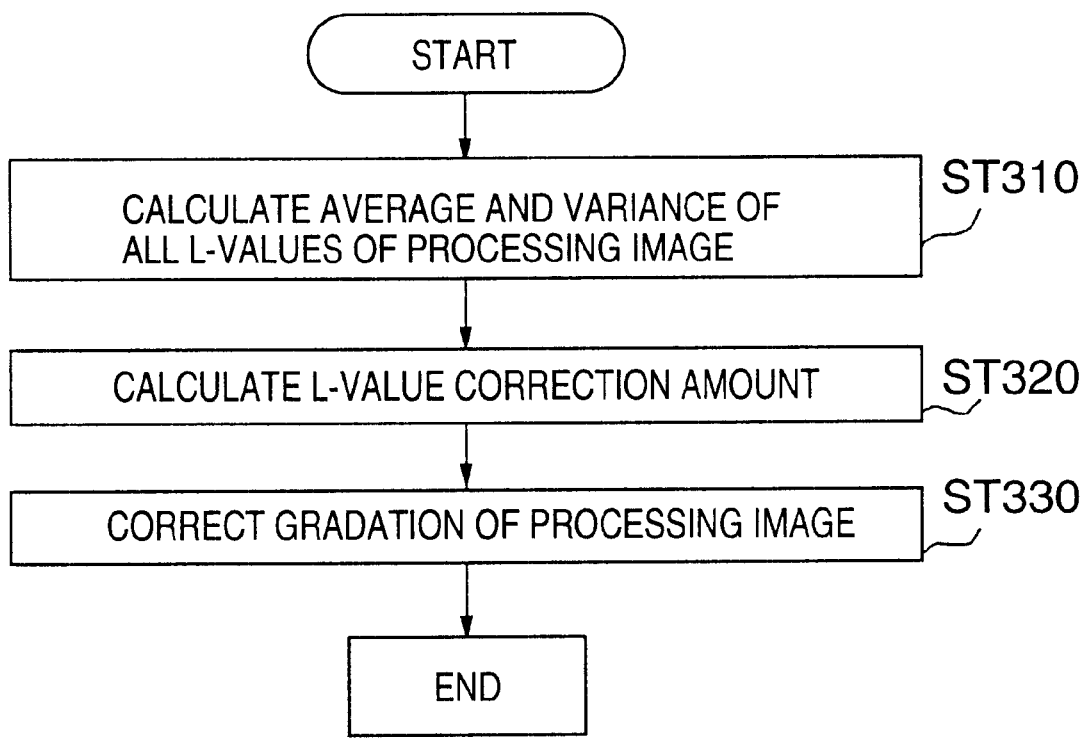
FIG. 9 is a flowchart for explaining another gradation correcting process according to the present invention.

FIG. 9 is a flowchart for explaining another process executed by the gradation correcting program.

In step ST310, an average and a variance of all L-values of the processing image are calculated. That is, the calculated average and variance show a luminance average and a luminance variance of the processing image.

In step ST320, an L-value correction amount is calculated based on the variance calculated in the step ST310 by the following expression:

*L*-value correction amount=variance×*n* where n is a predetermined number within a range of from 0 to 1.0 (0<n<1.0). In this case, the L-value correction amount can be independently calculated for the HL value and the SD value.

In step ST330, based on the calculated L-value correction amount, a gradation of the processing image is corrected.

FIG. 20A is a diagram showing a case in which the variance is large, that is, a difference between the HL value and the SD value is large. In this case, the L-value correction amount calculated in the step ST320 is large. Thus, referring to FIG. 20A, the L-value of the processing image before the gradation correction (a−1) is corrected by the great correction amount after the gradation correction (a−2).

FIG. 20B is a diagram showing a case in which the variance is small, that is, a difference between the HL value and the SD value is small. In this case, the L-value correction amount calculated in the step ST320 is small. Thus, referring to FIG. 20B, the L-value of the processing image after the gradation correction (b−1) is corrected by the small correction amount after the gradation correction (b−2).

A process executed by the leveling program 500 will now be described.

Figure 21A:
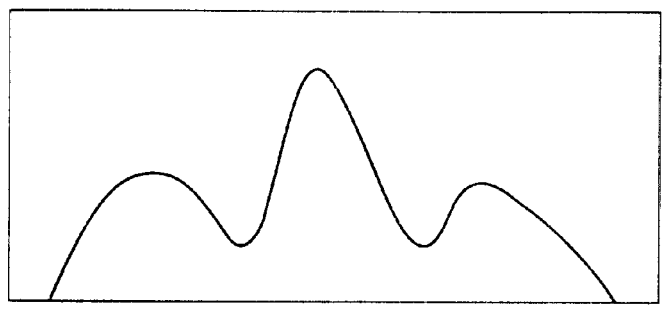
FIGS. 21A, 21B and 21C are diagrams for explaining the leveling process according to the present invention.
Figure 21B:
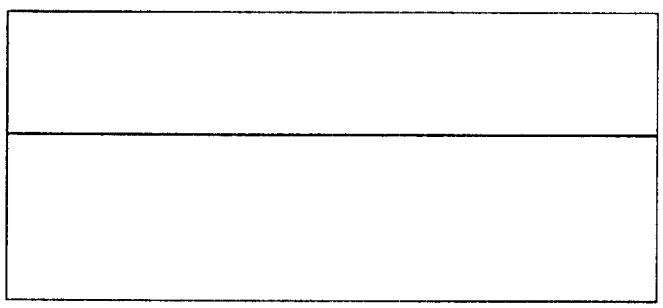
Figure 21C:
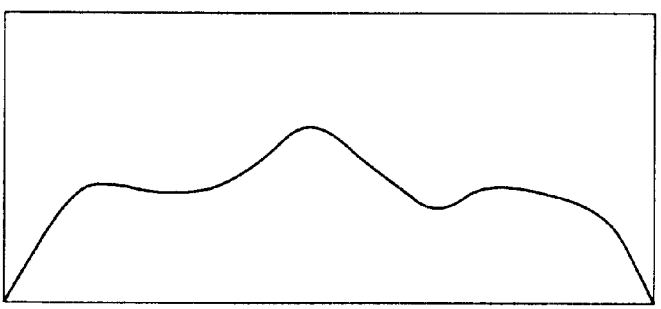

The leveling program 500 improves the contrast of the processing image by leveling a brightness distribution of the processing image. When the processing image having a brightness histogram as shown in FIG. 21A is averaged at a 100% level, the processing image becomes a 100% leveled image having a flat brightness histogram as shown in FIG. 21B. When the processing image having a brightness histogram as shown in FIG. 21A is averaged at less than 100% level, the processing image becomes a leveled image having another brightness histogram as shown in FIG. 21C.

Figure 10:
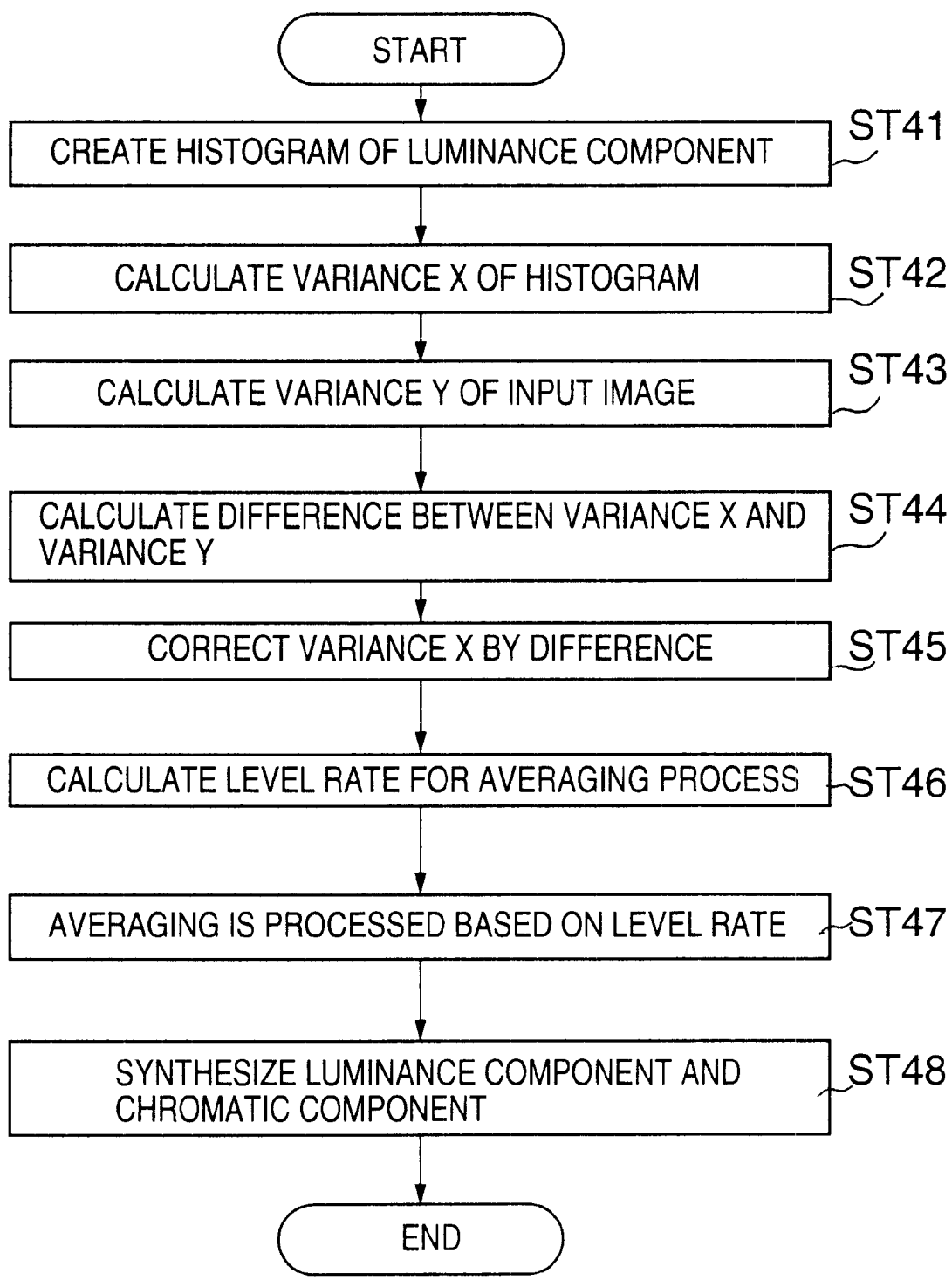
FIG. 10 is a flowchart for explaining a leveling process according to the present invention.

FIG. 10 is a flowchart for explaining the process executed by the leveling program 500.

When the leveling program 500 is executed, a luminance histogram of the L-values in the processing image output from the gradation correcting program 400 is created in step ST41 in FIG. 10.

In step ST42, a variance X of the created histogram is calculated. Subsequently, in step ST43, a variance Y of the original image input into the color space transforming program 100 is calculated. In step ST44, a variance difference (X–Y) between the variance X calculated in the step ST41 and the variance Y calculated in the step ST42 is calculated.

In step ST45, the variance X calculated in the step ST41 is corrected based on the variance difference (X–Y). For example, the variance X is corrected by the following expression:

$$\text{variance } X = \text{variance } X \times \left[1 + \frac{\text{variance difference } (X-Y)}{\text{variance difference reference}}\right]$$

when the variance difference reference when the variance difference reference is predetermined based on experiences.

According to the expression, when the variance X is greater than the variance Y (X>Y), the variance X is corrected to be greater. When the variance X is less than the variance Y (X<Y), the variance X is corrected to be less. That is, when a current variance becomes greater than an original variance after the image processing, the current variance is corrected to be slightly greater. When the variance current variance becomes less than the original variance after the image processing, the current variance is corrected to be slightly less. Consequently, the leveling program 500 emphasizes effects in which the image processing affects the variance of the processing image.

In accordance with the expression, for example, when the variance difference reference is '32' and the variance difference is '+8', the variance X becomes 125% of the original variance (variance Y). When the variance difference reference is '32' and the variance difference is '–8', the variance X becomes 75% of the original variance (variance Y).

In step ST46, a level rate is calculated to average the brightness histogram. The calculated level rate will be used in the following steps.

The level rate is calculated based on the variance corrected in the step ST45. For example, the level rate is calculated by the following expression:

$$\text{level rate} = \text{maximum level rate} - \text{variance} \times \frac{\text{maximum level rate}}{\text{maximum variance}}$$

where the maximum level rate is predetermined based on experience. The maximum level rate may be obtained based on the range of the L-value. For example, the maximum level rate may be defined as '128' (=125÷2).

Figure 22A:
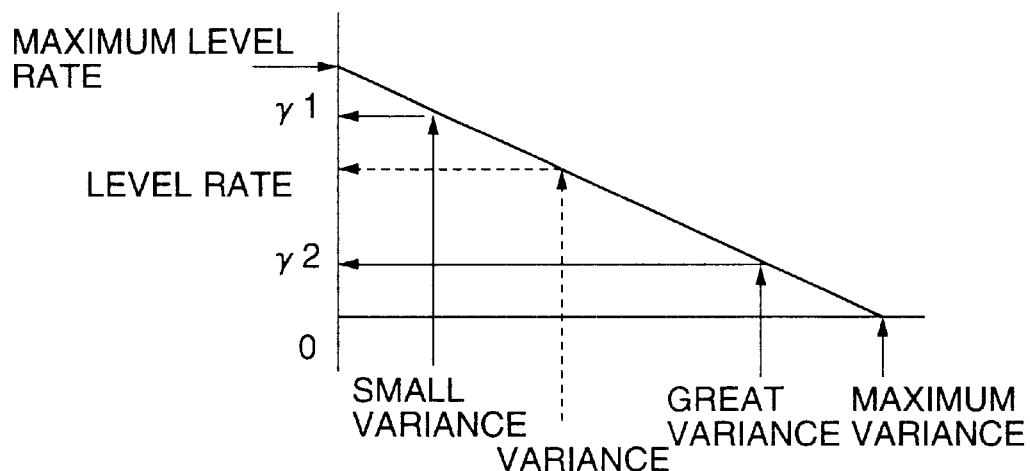
FIGS. 22A, 22B and 23C are diagrams for explaining the leveling process according to the present invention.

As shown in FIG. 22A, the greater the variance is, the less the level rate is. That is, when the variance is great, the processing image is closer to being in a leveled image. Thus, the processing image is averaged by a lesser level rate. When the variance is small, the processing image is far from being in the leveled state. Thus, the processing image is averaged by a greater level rate.

According to the expression, for example, in a case in which the maximum variance is '128' and the maximum level rate is '30', when the variance is '16', the level rate becomes '26.25'. In another case in which the maximum variance '128' and maximum level rate is '30', when the variance is '80', the level rate becomes '11.25'.

In step ST47, the processing image is averaged based on the calculated level rate for each L-value between '0' and '255'.

For example, when the entire processing image has 256000 pixels, the number of pixels of each L-value is determined as 1000 pixels (=256000÷256 gradients. When the total number of pixels up to a certain L-value is 21000 pixels and the number of pixels having that L-value is 5000 pixels, that L-value in a perfectly leveled state is approximately determined by the following expression:

$$L=(21000/1000)+(5000/1000)/2=23.5$$

Figure 22B:
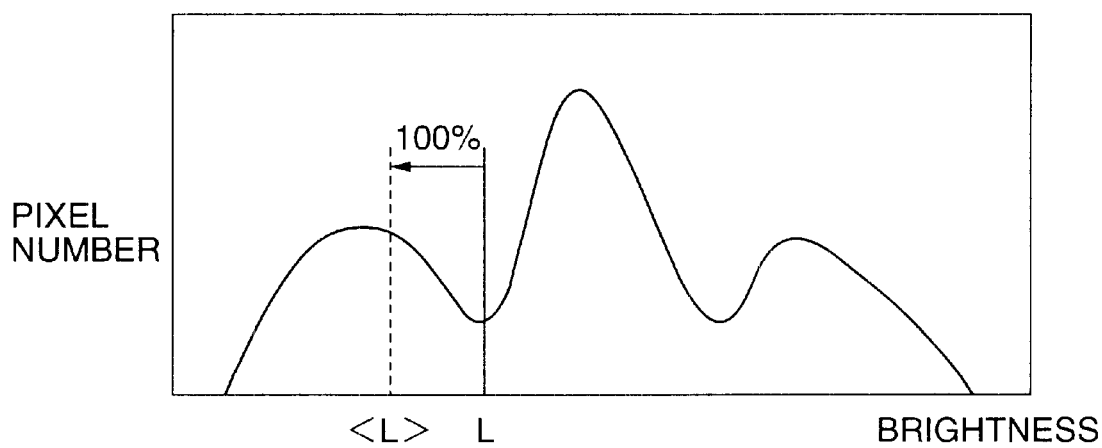

For example, when that L-value is '50', that L-value is shifted to '23.5' by the above expression. That is, as shown in FIG. 22B, each L-value is corrected to be an L-value (shown by <L> in FIG. 22B) specified by the luminance histogram created in the step ST41 to achieve the perfectly leveled state. Accordingly, leveling the brightness distribution of the processing image by the 100% level is achieved.

In step ST47, a correction shit amount is calculated by multiplying a L-value shift amount from that L-value to the value <L> realizing the perfectly leveled state and the level rate calculated in step ST46. Based on the correction shift amount, the contrast is corrected.

For example, the L-value is corrected from '50' to '23.5' to average perfectly (the 100% level). In step ST46, when 10% is obtained for the level rate, the corrected L-value is calculated as follows:

$$50-(50-23.5)\times 0.1=47.35$$

so that the L-value is corrected from '50' to '47.35' to average the luminance histogram.

Leveling is processed based on the level rate calculated in step ST47 and the corrected luminance component (L-value) and the two chromatic components (a-value and b-value) that are not corrected are synthesized. The process executed by the leveling program 500 is terminated.

As described above, the leveling program 500 calculates the variance of the brightness of the processing image output from the gradation correcting program 400. Based on the calculated variance, the level rate is defined such that the level rate becomes less when the brightness variance becomes greater. The brightness distribution of the processing image is averaged based on the level rate. Therefore, the present invention makes it possible to improve the contrast of the processing image by the leveling process, instead of by using the specialist.

A process executed by the γ-converting program 600 will now be described.

The γ-converting program 600 converts the L-value based on a defined γ-value by the following conversion expression:

$$L_{out}=L_{in}^{1/\gamma} \text{ where } \gamma \text{ denotes the } \gamma\text{-value}$$

Figure 23A:
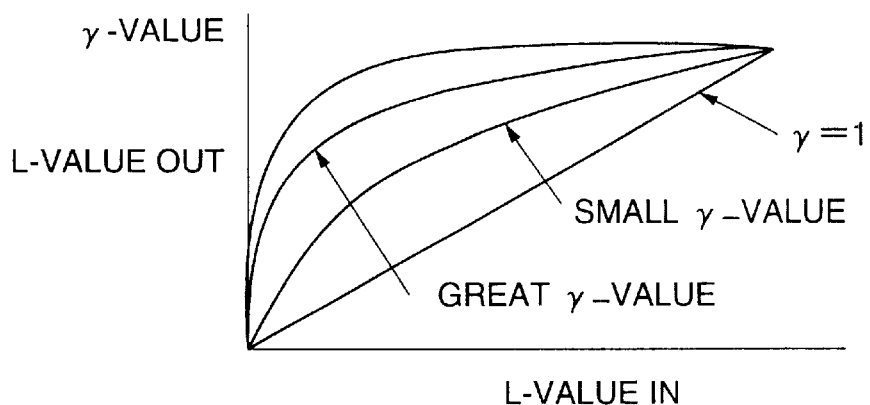
FIGS. 23A and 23B are diagrams for explaining a converting process according to the present invention.

As shown in FIG. 23A, the luminance in the dark areas is corrected with a great change and the luminance in the bright areas is corrected with a small change. Thus, it is possible to make the dark areas more visible.

Figure 11:
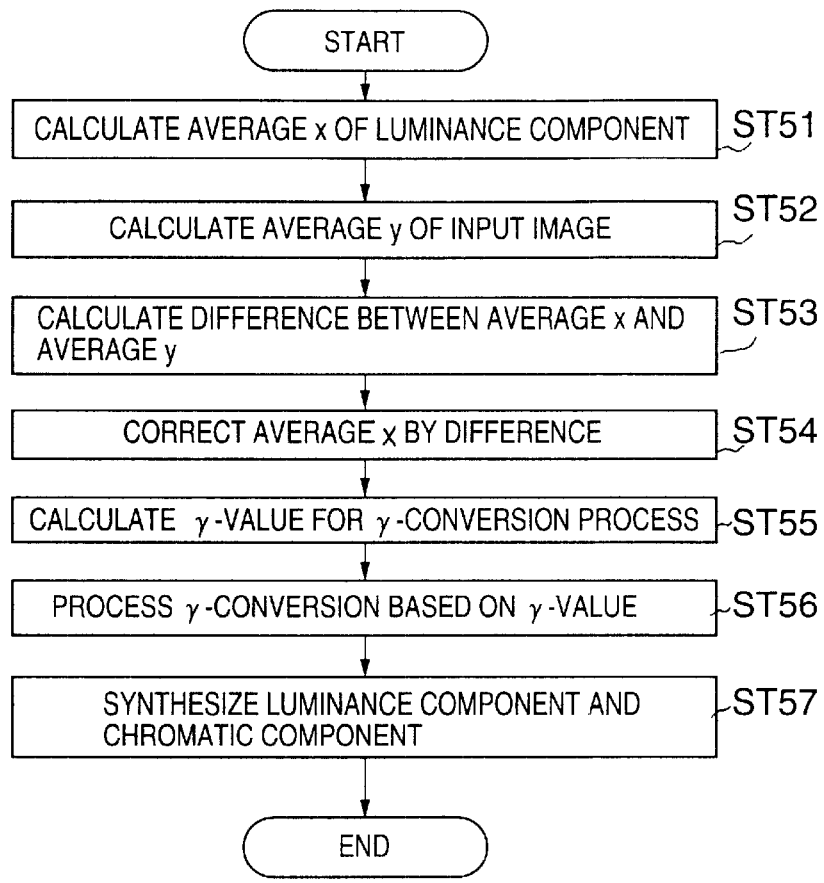
FIG. 11 is a flowchart for explaining a γ-converting process according to the present invention.

FIG. 11 is a flowchart for explaining a process executed by the, γ-converting program 600.

Figure 23B:
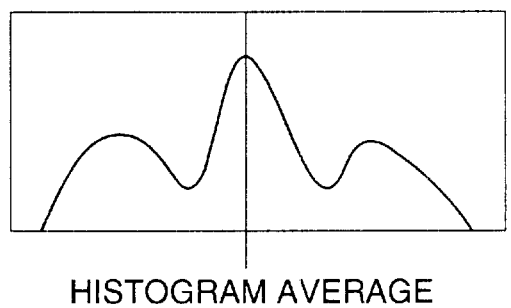

When the γ-converting program 600 is executed, an average x of the luminance component (L-value) of the processing image from the leveling program 500 is calculated in step ST51. That is, the average x, shown in FIG. 23B, of the luminance component (L-value) of the processing image from the leveling program 500 is obtained.

In step ST52, an average y of the original image input into the color space transforming program 100 is calculated. Subsequently, in step ST53, an average difference (x–y) between the average x calculated in the step ST51 and the average y calculated in the step ST52 is calculated.

In step ST54, the average x calculated in the step ST51 is corrected based on the average difference (x–y). For example, the average x is corrected by the following expression:

$$\text{average } x = \text{average } x \times \left[1 + \frac{\text{average difference }(x-y)}{\text{average difference reference}}\right]$$

when the average difference reference is predetermined based on experience.

According to the expression, when the average x is grater than the average y (x>y), the average x is corrected to be greater. When the average x is smaller than the average y (x<y), the average x is corrected to be less. That is, when a current average becomes greater than an original average after the image processing, the current average is corrected to be slightly greater. When the current average becomes less than the original average after the image processing, the current average is corrected to be slightly less. Consequently, the γ-converting program 600 emphasizes effects in which the image processing affects the average of the processing image.

In accordance with the expression, for example, when the average difference reference is '32' and the average difference is '+8', the average x becomes 125% of the original average (average y). When the average difference reference is '32' and the average difference is '–8', the average x becomes 75% of the original average (average y).

Subsequently, in step ST55, the γ-value is calculated for the γ-conversion. As mentioned above, the γ-converting program 600 processes the γ-conversion based on the following expression:

$$L_{out}=L_{in}^{1/\gamma} \text{ where } \gamma \text{ is the } \gamma\text{-value.}$$

The γ-value is calculated for this expression in the step ST55.

To calculate γ-value, the average corrected in the step ST54 is used. For example, the γ-value may be calculated based on the following expression:

$$\gamma\text{- value} = \text{maximum } \gamma\text{- value} - \text{average} \times \frac{\text{maximum } \gamma\text{- value} - 1.0}{\text{maximum } L\text{-value}}$$

The maximum γ-value is a predetermined experience value and the maximum L-value is an upper limit L-value '255'.

Figure 23C:
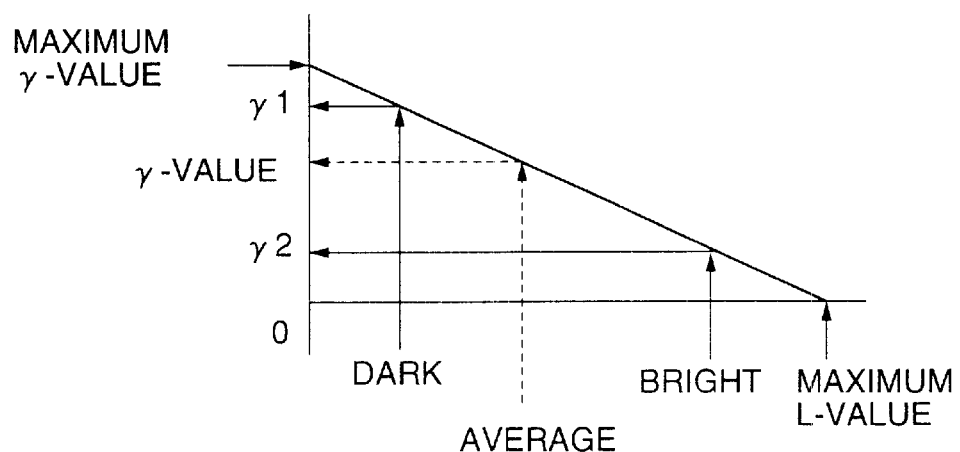

That is, as shown in FIG. 23C, when the γ-value is determined based on the expression in which the γ-value is becoming closer to being 1.0 when the average is becoming larger. In the expression, when the L-value average is larger, the luminance component is strong (bright). Thus, the γ-value is set to be smaller so that the γ-conversion is not greatly processed. On the other hand, when the L-value average is small, the luminance component is weak (dark). Thus, the γ-conversion is greatly processed.

According to the expression, for example, in a case in which the maximum L-value is '255' and the maximum γ-value is '22', when the average is '16', the γ-value is '2.1'.

Subsequently, in step ST56, the γ-conversion is processed based on the calculated γ-value. That is, the L-value of the processing image from the leveling program 500 is converted based on the following expression:

$$L_{out}=L_{in}^{1/\gamma} \text{ where } \gamma \text{ denotes the } \gamma\text{-value.}$$

The corrected luminance component (L-value) and the two chromatic components (a-value and b-value) that are not corrected are synthesized in step ST57.

The γ-converting program 600 averages the L-values of the processing image from the leveling program 500 and determines the γ-value based on the averaged L-value. Since the brightness of the processing image is converted by using the determined γ-value, the γ-converting program 600, instead of the specialist, makes the processing image visible clearer by the γ-conversion in which the γ-value is becoming approximately '1.0' when the L-value average is becoming larger. Therefore, it is possible to process the γ-conversion corresponding to the characteristic of the processing image.

A process executed by the tone correcting program 700 will now be described.

Figure 12:
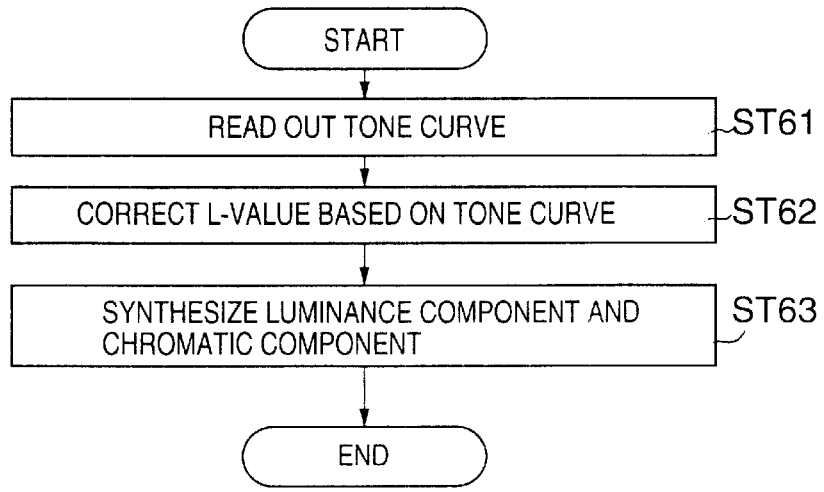
FIG. 12 is a flowchart for explaining a tone correcting process according to the present invention.

FIG. 12 is a flowchart for explaining the process executed by the tone correcting program 700.

Figure 24:
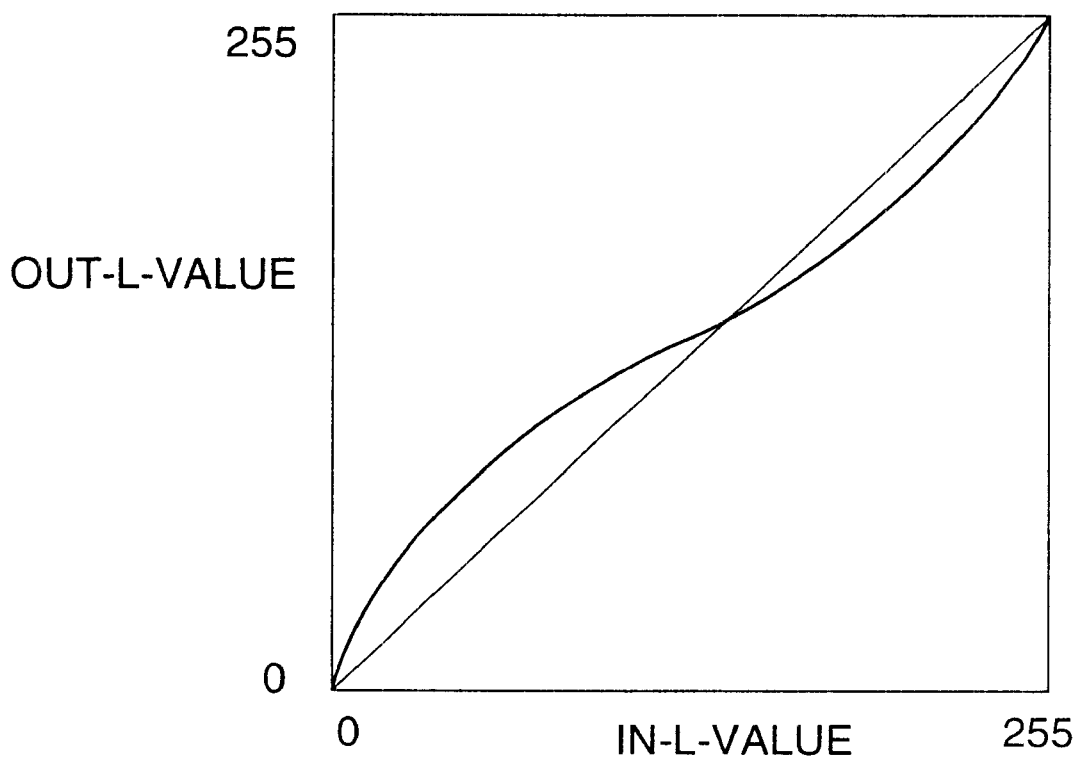
FIG. 24 is a diagram showing a tone correcting process according to the present invention.

When the tone correcting program 700 is executed, the tone correcting program 700 reads a tone curve defined by a user from a memory unit 82 in FIG. 1 in step ST61. The tone curve defined by the user shown in FIG. 24 is stored in the memory unit 82 in FIG. 1 and then the tone curve is read out from the memory unit 82. The tone curve may be given as a table of information or a mathematical expression.

In step ST62, based on the read tone curve, each L-value is corrected. In the tone curve, an IN-L-value before the correction corresponds to an OUT-L-value after the correction.

In step ST63, the corrected luminance component (L-value) and the two chromatic components (a-value and b-value) that are not corrected are synthesized. The process executed by the tone correcting program 700 is terminated.

As described above, the tone correcting program 700 corrects the brightness of the processing image to a desired brightness based on the tone curve defined by the user.

A process executed by the saturation intensity program 710 will now be described.

Figure 13:
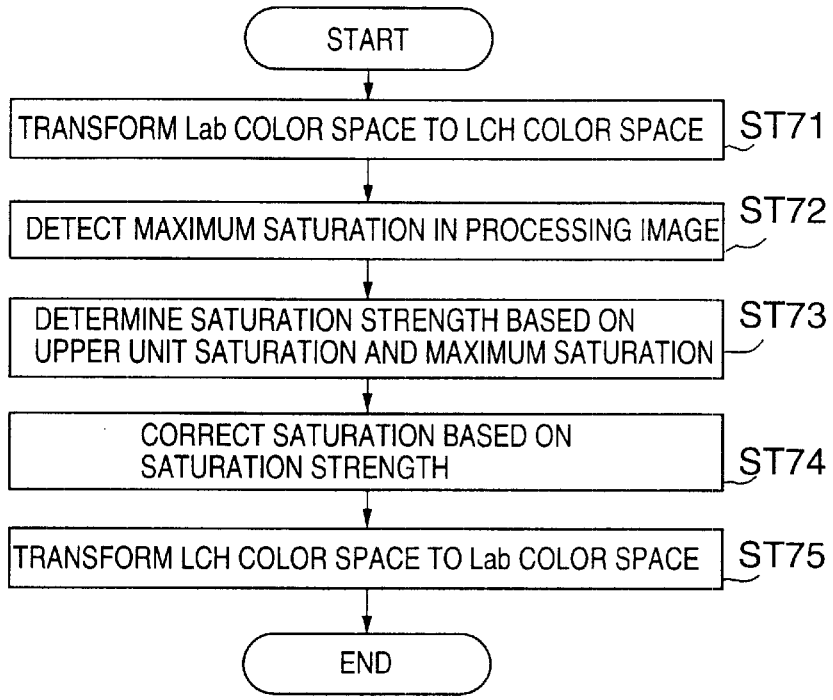
FIG. 13 is a flowchart for explaining a saturation intensity process according to the present invention.

FIG. 13 is a flowchart for explaining the process executed by the saturation intensity program 710.

When the saturation intensity program 710 is executed, the saturation intensity program 710 transforms the Lab color space of the processing image from the tone correcting program 700 into a LCH color space in step ST71. That is, the LCH color space is composed of luminance (L-value), color saturation (C-value) and hue (H-value).

Subsequently, a maximum C-value in the processing image is detected in step ST72 and then a color saturation intensity Ca is determined based on the detect maximum C-value and a logically obtained upper limit C-value or an upper limit C-value defined by the user in step ST73. For example, the color saturation intensity Ca can be calculated by the following expression:

color saturation intensity $Ca$=upper limit $C$-value/maximum $C$-value

A coefficient defined by the user may be multiplied so that the color saturation intensity Ca can be smaller than '1'.

In step ST74, the C-value is corrected by multiplying the C-value by the color saturation intensity Ca. In step ST75, the color space of the processing image is transformed from the LCH color space into the Lab color space. The process executed by the saturation intensity program 710 is terminated.

As described above, the saturation intensity program 710 corrects the hue of the processing image to a desired hue intensity based on the simple calculation using the maximum C-value and the logically obtained upper limit C-value or the upper limit C-value defined by the user.

A process executed by the hue intensity program 720 will now be described.

Figure 14:
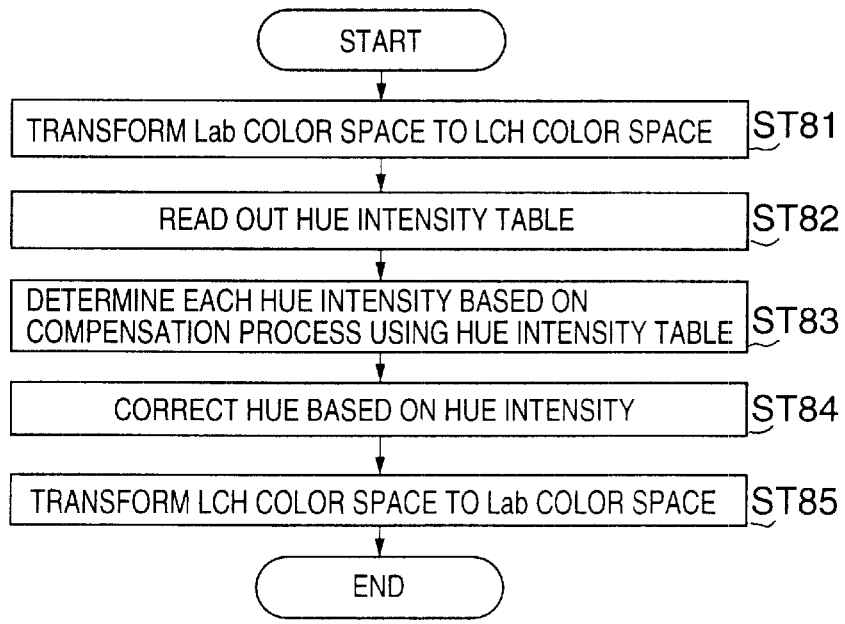
FIG. 14 is a flowchart for explaining a hue intensity process according to the present invention.

FIG. 14 is a flowchart for explaining the process executed by the hue intensity program 720.

When the hue intensity program 720 is executed, the color space of the processing image is transformed from the Lab color space into the LCH color space in step ST81. When the hue intensity program 720 is always processed after the saturation intensity program 710, the step ST75 of the saturation intensity program 710 for transforming the LCH color space into the Lab color space can be omitted. In this case, the step ST81 can also be omitted.

Subsequently, in step ST82, a hue intensity table defined by the user is read out from the memory unit 82 in FIG. 1. The hue intensity table as shown in FIG. 25A shows a hue intensity amount for each representative color: magenta, red, yellow, green, cyan and blue, and is stored in the memory unit 82 in FIG. 1.

Figures 25A, 25B:
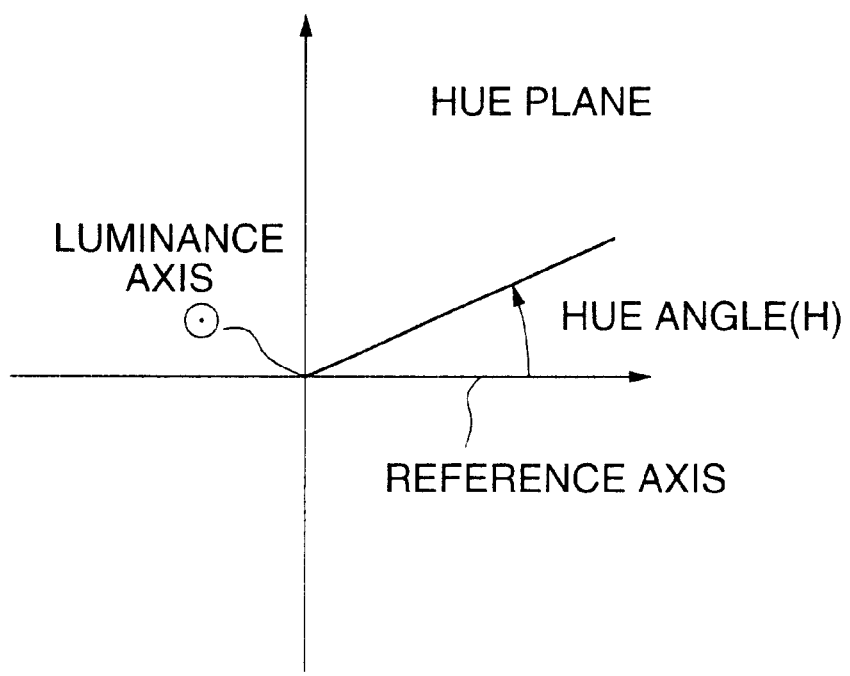
FIGS. 25A and 25B are diagrams for explaining a hue intensity process according to the present invention.

Referring to FIG. 25B, the H-value is defined as an angle with respect to a reference axis and the hue intensity amount in the hue intensity table is given as an angle difference. The hue intensity table can be given as a continuous value such as a tone curve shown in FIG. 24 or as a mathematical expression.

In step ST83, the hue intensity amount of each H-value is determined in accordance with a compensation process by using the read hue intensity table. In the compensation process, it is specified where the H-value to be intensified is located between two representative hues defined in the hue intensity table. Consequently, the hue intensity amount of the H-value is determined by a proportional distribution calculation corresponding to the H-value location. When the hue intensity table is given as continuous data such as the tone curve, the compensation process is not required. The hue intensity amount of the H-value is just referred to from the hue intensity table and determined.

Each H-value is intensified based on the determined hue intensity in step ST84. Thereafter, the color space of the processing image is transformed from the LCH color space into the original Lab color space and the process executed by the hue intensity program 720 is terminated in step ST85.

As described above, the hue intensity program 720 intensifies the hue of the processing image into a desired hue based on the hue intensify table defined by the user.

A program executed by the sharpening program 730 will now be described.

Figure 15:
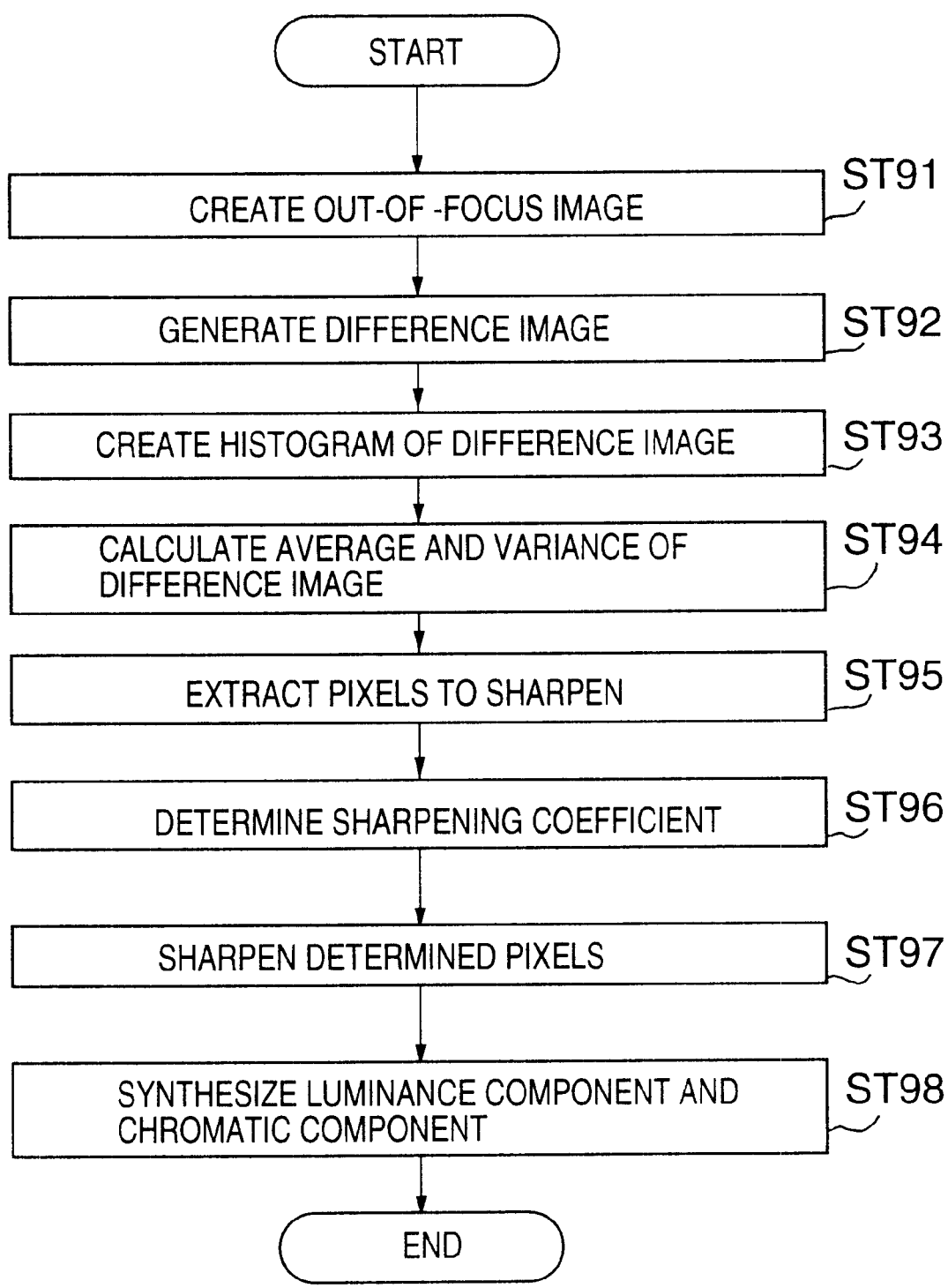
FIG. 15 is a flowchart for explaining a sharpening process according to the present invention.

FIG. 15 is a flowchart for explaining the process executed by the sharpening program 730.

When the sharpening program 730 is executed, an out-of-focus image of the processing image is generated by using a filter having a filter size of 9×9 block of pixels for a leveling operation in step ST91.

Figure 26:
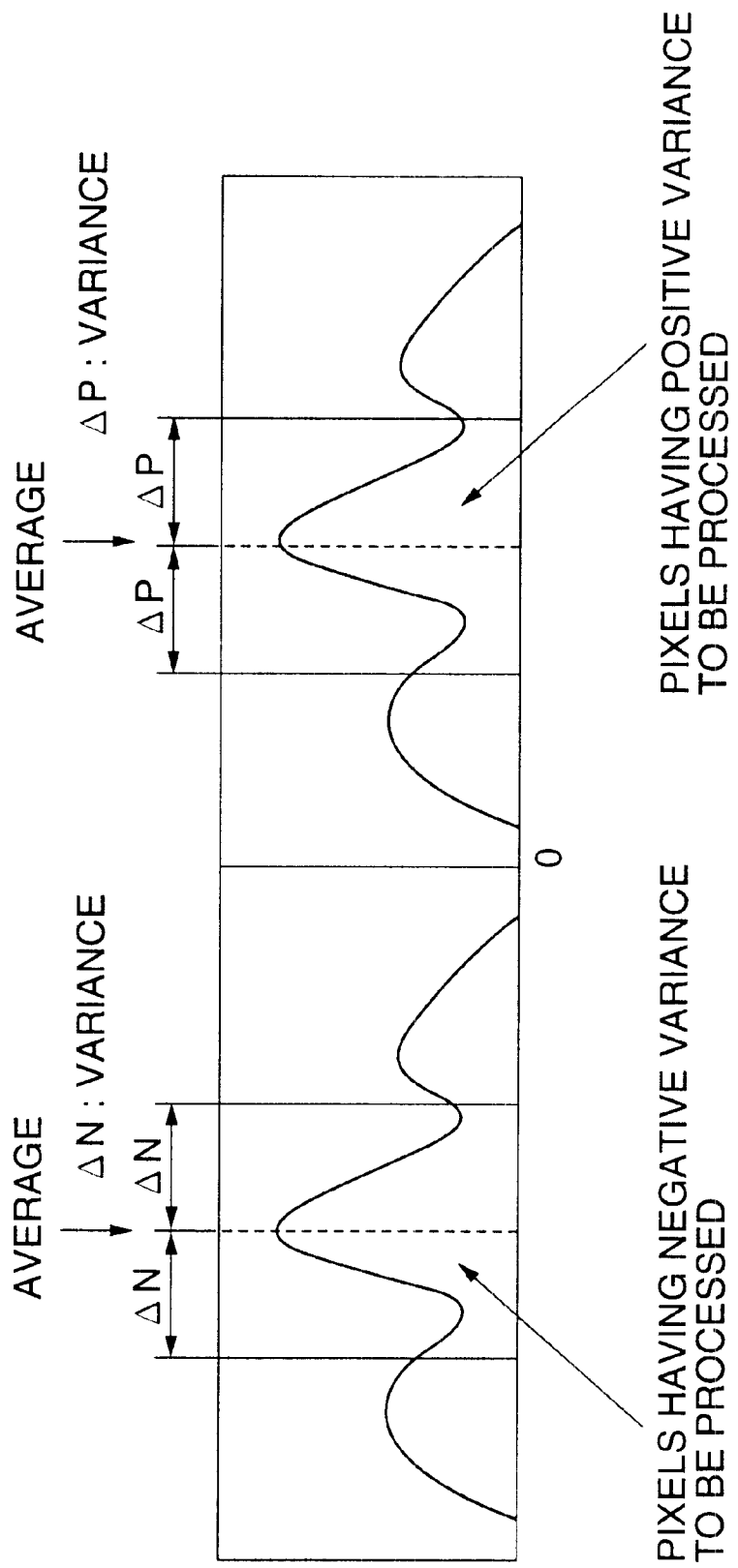
FIG. 26 is a diagram for explaining a sharpening process according to the present invention.

In step ST92, a image difference between the original image and the out-of-focus image, that is, an L-value difference image, is generated and then edges in the original image are extracted. In step ST93, an L-value histogram of the difference image is created. That is, the L-value histogram shown in FIG. 26 is created.

In step ST94, a histogram average and a histogram variance of the created L-value histogram are calculated for a positive difference image having positive L-values and a negative difference image having negative L-values, respectively. In step ST95, pixels to be processed in the sharpening process are extracted from a range determined by the calculated histogram average and the histogram variance. As shown in FIG. 26, pixels located in the range including the greatest L-value difference and the least L-value difference are extracted to sharpen.

In step ST96, a sharpening coefficient indicating a sharpening strength is determined. For example, for the positive difference image having the positive L-values and the negative difference image having negative L-values, respectively, the sharpening coefficient is determined by the following expression:

sharpening coefficient=maximum $L$-value/variance

Or, the sharpening coefficient may be determined interactively with the user.

In step ST97, the pixels extracted in the step ST95 are sharpened by using the determined sharpening coefficient based on the following expression:

$g=g-(g-f)\times \alpha$ where g is an L-value of the original image
f is an L-value of the out-of-focus image
$\alpha$ is a sharpening coefficient.

In step ST98, the luminance component and the two chromatic components (a-value and b-value) that are not processed are synthesized. Then, the process executed by the sharpening program 730 is terminated.

Figure 27:
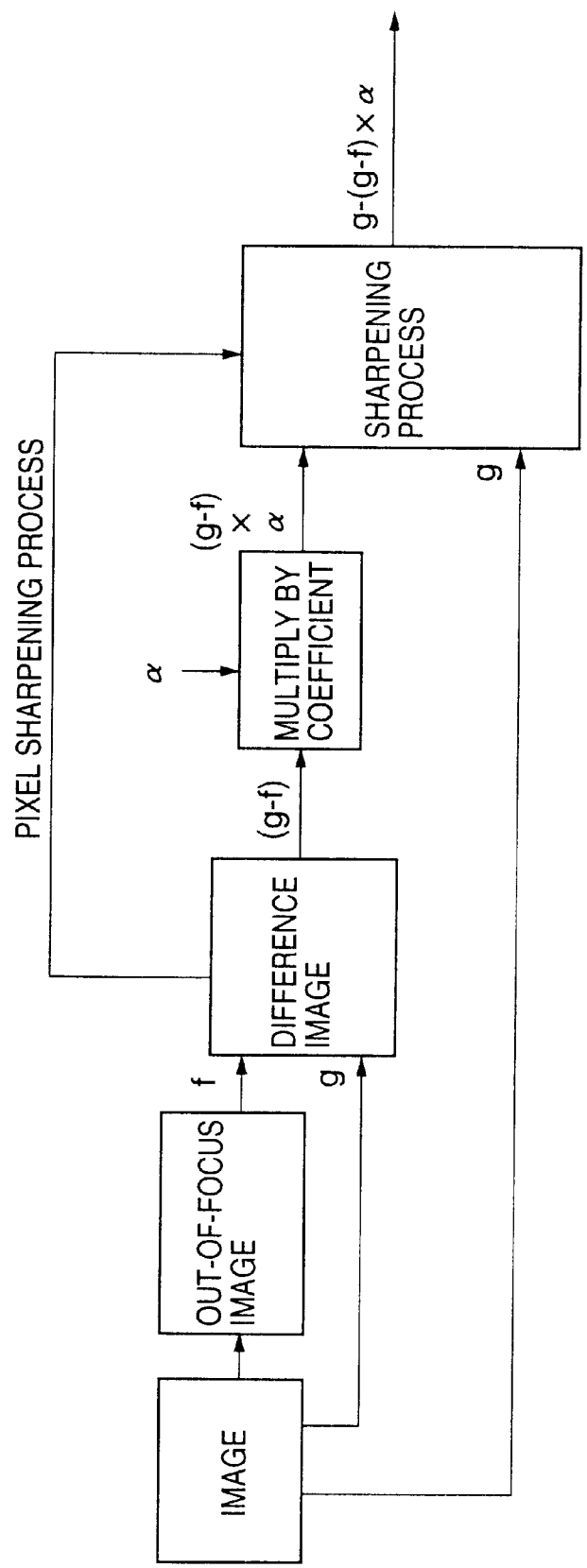
FIG. 27 is a diagram for explaining the sharpening process according to the present invention.

As described above, the sharpening program 730 determines the pixels having stronger edges or weaker edges in the processing image as shown in FIG. 27. Therefore, the sharpening program 730 makes the processing image to be perceived as being clearer.

In this process, pixels having values around 0 in the histogram in FIG. 26 have a high possibility of including noise. Referring to FIG. 26, at least pixels having L-values within a range between zero and a variance where the histogram average is subtracted by $\Delta P$ (histogram average−$\Delta P$) are not extracted in the positive difference image and not sharpened. In addition, at least pixels having L-values within a range between zero and a variance where the histogram average is added by $\Delta N$ (histogram average+$\Delta N$) are not extracted in the negative difference image and not sharpened.

A process executed by the magnifying program 740 will now be described.

The magnifying program 740 magnifies or reduces the processing image by calculating the luminance component and the chromatic component of pixels that are not located on a divided block vertex (hereinafter called a non-vertex pixel) based on the luminance and the chromatic component of pixels that are located on the divided block vertex (hereinafter called a vertex pixel).

According to the present invention, a bilinear method and a cubic convolution method of compensation methods are applied to the magnifying program 740.

In the bilinear method, a density f $(u_0, v_o)$ of the non-vertex pixels $(u_0, v_o)$ is calculated by the following expression using densities of four vertex pixels:

$$f(u_0, v_o) = f(u', v')(1-\alpha)(1-\beta) + f(u'+1, v')\alpha(1-\beta) + f(u', v'+1)(1-\beta)\beta + f(u'+1, v'+1)\alpha\beta$$

where $\alpha = u_o - u'$ and $\beta = v_0 - v$.

Figure 28:
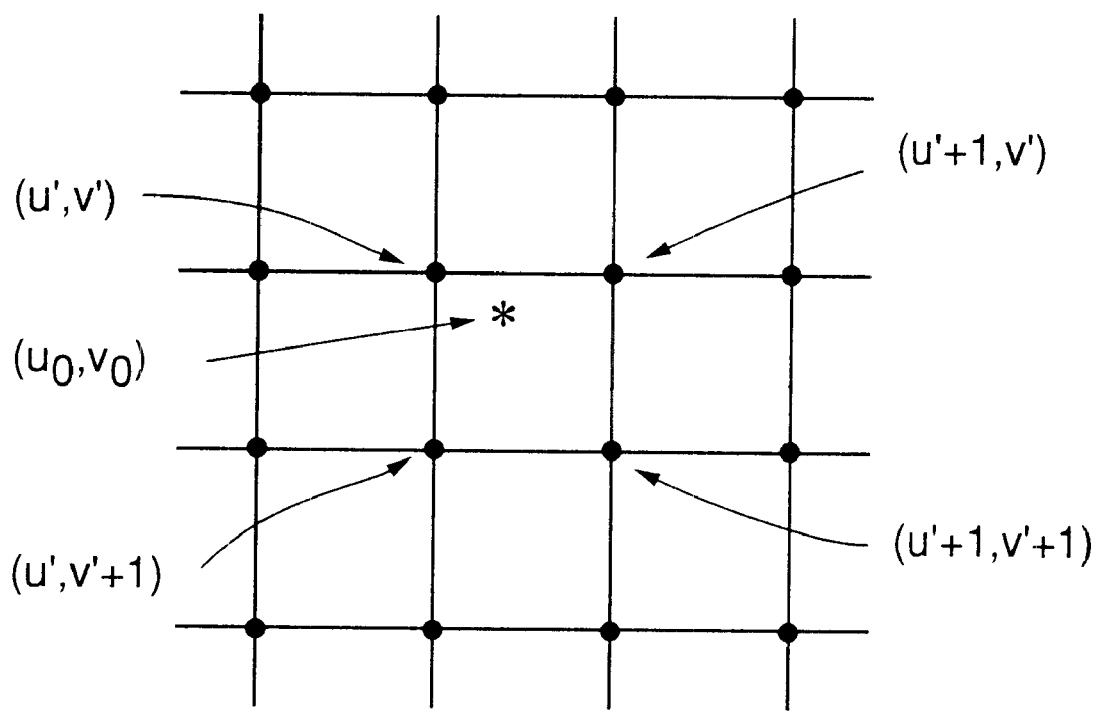
FIG. 28 is a diagram for explaining a magnifying process according to the present invention.

Since the bilinear method calculates the densities of four vertex pixels shown in FIG. 28, the bilinear method quickly calculates compensation.

In the cubic convolution method, the density $f(u_0, v_0)$ of the non-vertex pixels is calculated by using 16 peripheral vertex pixels as follows:

$$f(U_0, V_0) = \sum_k \sum_l f(u_k, v_l) C(u_k - u_0) C(v_1 - v_0)$$

$$\begin{aligned} C(x) &= 1 - 2|x|^2 + |x|^3 & 0 \leq |x| < 1 \\ &= 4 - 8|x| + 5|x|^2 - |x|^3 & 1 \leq |x| < 2 \\ &= 0 & 2 \leq |x| \end{aligned}$$

Advantageously, in the cubic convolution method, the density of the non-vertex pixels is obtained based on the densities of the 16 vertex pixels so that high compensation accuracy is obtained.

Figure 16:
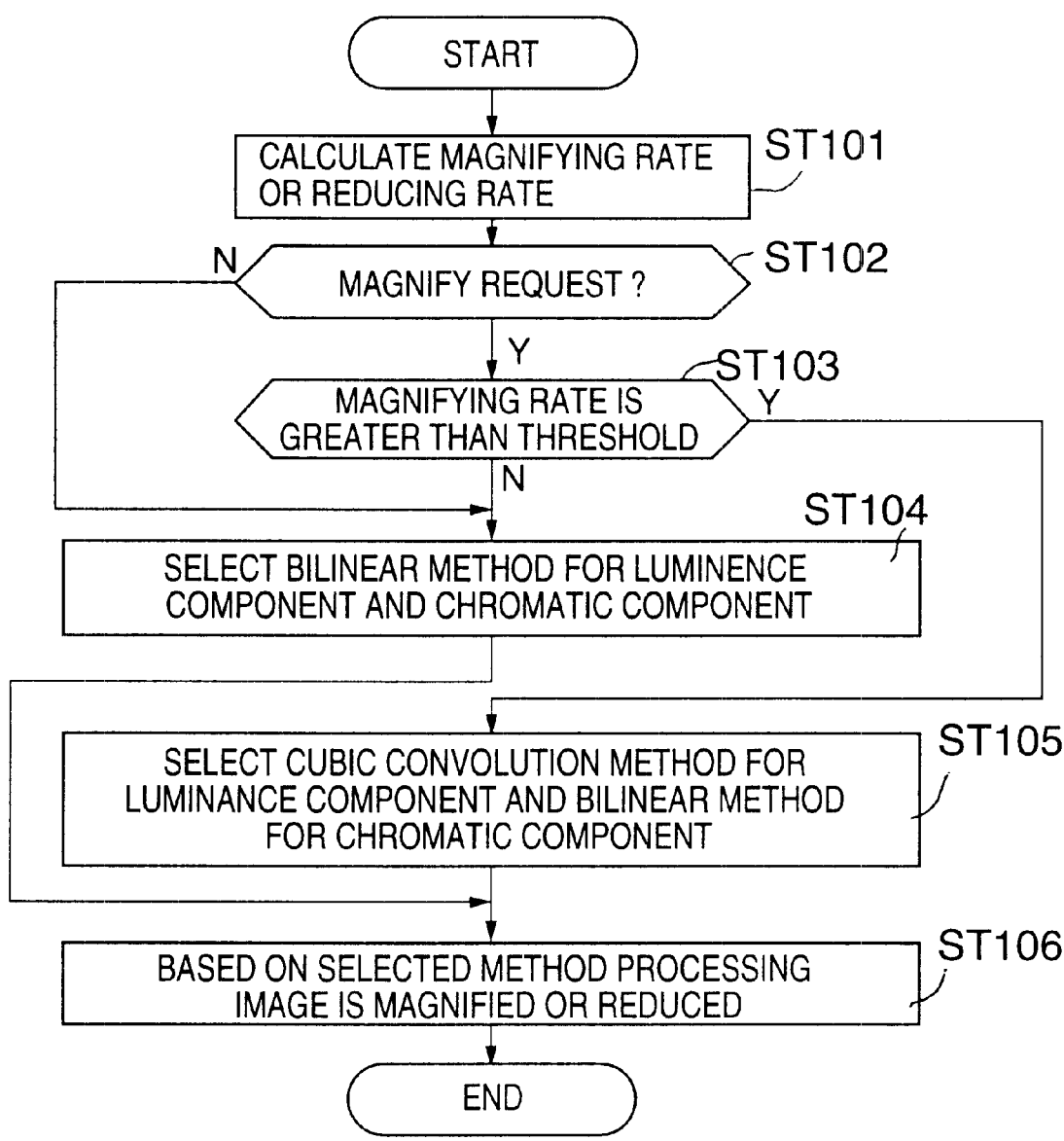
FIG. 16 is a flowchart for explaining a magnifying process according to the present invention.

FIG. 16 is a flowchart for explaining the process executed by the magnifying program 740.

When the magnifying program 740 is executed in response to an image size change request, a magnifying rate or a reducing rate indicated by the image size change request is calculated in step ST101.

In step ST102, it is determined whether the image size change request is a magnify request or a reduce request. When it is determined that the image size change request is the reduce request, the process goes to step ST104 since a sufficient accuracy for the reduce request can be obtained by the bilinear method. In the step ST104, the luminance component and the chromatic component of the non-vertex pixels are calculated by the bilinear method.

On the other hand, in step ST102, when the image change request is the magnify request, the process goes to the step ST103. In the step ST103, it is determined whether or not the magnify request indicates a magnifying rate greater than a predetermined threshold (for example, 300%). When it is determined that the magnify request does not indicate a magnifying rate greater than the predetermined threshold, the process goes to the step ST104 since the bilinear method is adequate to obtain the accuracy corresponding to the magnify request. In the step ST104, the luminance component and chromatic component of the non-vertex pixels are determined by the bilinear method.

Conversely, in the step ST103, if it is determined that the magnify request indicates greater magnifying rate than the predetermined threshold, the process goes to step ST105. In the step ST105, the process selects the cubic convolution method for the luminance component since a high accuracy is required for the luminance component when the processing image is magnified and then the luminance component of the non-vertex pixels is calculated by the cubic convolution method. The process selects the bilinear method for the chromatic component since the human eye is relatively insensitive to the chromatic component. The luminance component of the non-vertex pixels is also calculated by the bilinear method in this case.

Subsequently, the image size change request is processed based on the selected compensation methods and then the process executed by the magnify program 740 is terminated.

As mentioned above, when the processing image is magnified or reduced, the magnify program 740 selects and executes a compensation method realizing a high speed process for the luminance component that is insensitively perceived by the human eye. However, the magnify program 740 selects and executes another compensation method realizing a high accuracy for the chromatic component when the magnifying rate is greater than the threshold, and selects and executes the compensation method realizing a high speed process for the chromatic component when the magnifying rate is not greater than the threshold. Accordingly, the magnifying program 704 makes it possible to magnify or reduce the processing image with high speed and high accuracy.

The present invention is not limited to the color spaces described in the embodiment.

In the embodiment, the image processing is executed in the order of the transforming process, the HL/SD detecting process, the white balance correcting process, the gradation correcting process, the leveling process, the γ-converting process, the tone correcting process, the saturation intensity process, the hue intensity process, the sharpening process and the magnifying process. The present invention is not limited to the order of processes described in the embodiment. The order of the processes can be rearranged.

Also, another leveling process can apply to the present invention.

The present invention is not limited to the specifically disclosed embodiments, variations and modifications, and other variations and modifications may be made without departing from the scope of the present invention.

The present application is based on two Japanese Priority Applications No. 11-122186 filed on Apr. 28, 1999 and No. 11-306384 filed on Oct. 28, 1999, the entire contents of which are hereby incorporated by reference.

What is claimed is:

1. An image processing apparatus for processing images, comprising:

a color space transforming part transforming an input color space of an input image to a process color space of a processing image having pixels having a luminance value;

a HL/SD values detecting part detecting a HL value that shows a brightest luminance value of the pixels of the processing image and an SD value that shows a darkest luminance value of the pixels of the processing image;

a white balance correcting part correcting an improper white balance of the processing image;

a gradation correcting part correcting a luminance gradation of the processing image based on a gradation correction line;

a leveling part leveling a luminance distribution of the processing image based on variances and leveling rates of the processing image; and a γ-converting part converting a luminance average of the processing image to a γ-value and correcting the luminance of the processing image based on the γ-value, thereby image noises are eliminated, wherein said HL/SD values detecting part comprises:

an extracting part extracting HL potential pixels having a potential HL value and SD potential pixels having a potential SD value from the pixels of the processing image;

an averaging part calculating an average of each HL potential pixel and pixels in a specific vicinity of the HL potential pixel and calculating an average of each SD potential pixel and pixels in a specific vicinity of the SD potential pixel; and a determining part specifying a maximum average of all averages for the HL potential pixels and determining the minimum average as the HL value, and specifying a maximum average of all averages for the SD potential pixels and determining the maximum average as the SD value.

2. An image processing apparatus for processing images, comprising:
- a color space transforming part transforming an input color space of an input image to a process color space of a processing image having pixels having a luminance value;
- a HL/SD values detecting part detecting a HL value that shows a brightest luminance value of the pixels of the processing image and an SD value that shows a darkest luminance value of the pixels of the processing image;
- a white balance correcting part correcting an improper white balance of the processing image;
- a gradation correcting part correcting a luminance gradation of the processing image based on a gradation correction line;
- a leveling part leveling a luminance distribution of the processing image based on variances and leveling rates of the processing image; and
- a γ-converting part converting a luminance average of the processing image to a γ-value and correcting the luminance of the processing image based on the γ-value,
- thereby image noises are eliminated,
- wherein said HUSD values detecting part comprises:
  - a histogram generating part generating a histogram showing a luminance component of the processing image;
  - an averaging part extracting pixels having bright luminance values and dark luminance values and calculating an average of luminance values of vicinity pixels within a predetermined region from each extracted pixel; and
  - a determining part determining a maximum average and a minimum average of all averages calculated by the averaging part as the HL value and as the SD value, respectively.

3. An image processing apparatus for processing images, comprising:
- a color space transforming part transforming an input color space of an input image to a process color space of a processing image having pixels having a luminance value;
- a HL/SD values detecting part detecting a HL value that shows a brightest luminance value of the pixels of the processing image and an SD value that shows a darkest luminance value of the pixels of the processing image;
- a white balance correcting part correcting an improper white balance of the processing image;
- a gradation correcting part correcting a luminance gradation of the processing image based on a gradation correction line;
- a leveling part leveling a luminance distribution of the processing image based on variances and leveling rates of the processing image; and
- a γ-converting part converting a luminance average of the processing image to a γ-value and correcting the luminance of the processing image based on the γ-value,
- thereby image noises are eliminated,
- wherein said gradation correcting part comprises:
  - a calculating part calculating a correction reference value based on the luminance values of the pixels in the processing image;
  - a determining part determining a first quadratic curve when the luminance value is an input variable, a first correction amount is an output variable for shifting the HL value to a maximum luminance value and the correction reference value is fixed, and a second quadratic curve when the luminance value is an input variable, a second correction amount is an output variable for shifting the SD value to a minimum luminance value and the correction reference value is fixed; and
  - a correcting part correcting the luminance values of the pixels in the processing image in accordance with the first quadratic curve and the second quadratic curve.

4. An image processing apparatus for processing images, comprising:
- a color space transforming part transforming an input color space of an input image to a process color space of a processing image having pixels having a luminance value;
- a HL/SD values detecting part detecting a HL value that shows a brightest luminance value of the pixels of the processing image and an SD value that shows a darkest luminance value of the pixels of the processing image;
- a white balance correcting part correcting an improper white balance of the processing image;
- a gradation correcting part correcting a luminance gradation of the processing image based on a gradation correction line;
- a leveling part leveling a luminance distribution of the processing image based on variances and leveling rates of the processing image; and
- a γ-converting part converting a luminance average of the processing image to a γ-value and correcting the luminance of the processing image based on the γ-value,
- thereby image noises are eliminated,
- wherein said leveling part comprises:
  - a variance calculating part calculating a variance of the luminance values of the processing image;
  - a level rate determining part determining a level rate corresponding to the variance by using a correction line when the variance is an input variable and the level rate is an output variable so that the level rate is inversely proportional to the 35 variance; and
  - a luminance correcting part correcting the luminance values of the processing image based on the level rate determined by the level rate determining part.

5. The image processing apparatus as claimed in claim 4, wherein said variance calculating part calculates the variance of the luminance values of the processing image, corrects the variance by using a variance difference between the variance and an input variance of the luminance values of the input image and determines the variance corrected as the input variable of the correction line.

6. An image processing apparatus for processing images, comprising:
- a color space transforming part transforming an input color space of an input image to a process color space of a processing image having pixels having a luminance value;
- a HL/SD values detecting part detecting a HL value that shows a brightest luminance value of the pixels of the processing image and an SD value that shows a darkest luminance value of the pixels of the processing image;
- a white balance correcting part correcting an improper white balance of the processing image;
- a gradation correcting part correcting a luminance gradation of the processing image based on a gradation correction line;

a leveling part leveling a luminance distribution of the processing image based on variances and leveling rates of the processing image; and a γ-converting part converting a luminance average of the processing image to a γ-value and correcting the luminance of the processing image based on the γ-value, thereby image noises are eliminated, wherein said γ-converting part comprises:

an average calculating part calculating an average of the luminance values of the processing image;

a γ-value determining part determining a γ-value corresponding to the average by using a correction line when the average is an input variable and the γ-value is an output variable so that the γ-value approximates to '1' while the average approximates to a brightest luminance value; and a luminance correcting part correcting the luminance values of the processing image based on the γ-value determined by the γ-value determining part.

7. The image processing apparatus as claimed in claim 6, wherein said average calculating part calculates the average of the luminance values of the processing image, corrects the average by using an average difference between the average and an input average of the luminance values of the input image and determines the average corrected as the input average of the correction line.

8. An image processing apparatus for processing images, comprising:

a color space transforming part transforming an input color space of an input image to a process color space of a processing image having pixels having a luminance value;

a HL/SD values detecting part detecting a HL value that shows a brightest luminance value of the pixels of the processing image and an SD value that shows a darkest luminance value of the pixels of the processing image;

a white balance correcting part correcting an improper white balance of the processing image;

a gradation correcting part correcting a luminance gradation of the processing image based on a gradation correction line;

a leveling part leveling a luminance distribution of the processing image based on variances and leveling rates of the processing image;

a γ-converting part converting a luminance average of the processing image to a γ-value and correcting the luminance of the processing image based on the γ-value;

an out-of-focus image generating part generating an out-of-focus image from the processing image;

a difference image generating part generating a difference image between the out-of-focus image generated by the out-of-focus image generating part and the processing image;

a histogram creating part creating a positive histogram for a positive difference image having positive luminance values and a negative histogram for a negative difference image having negative luminance values;

a calculating part calculating a positive variance and a positive average for the positive histogram and a negative variance and a negative average of the negative histogram;

a pixel extracting part extracting first pixels corresponding to a positive histogram region determined by the positive variance and the positive average and second pixels corresponding to a negative histogram region determined by the negative variance and the negative average; and a sharpening part sharpening the first pixels and the second pixels based on the luminance values of the input image and the luminance values of the difference image, thereby image noises are eliminated.

9. The image apparatus as claimed in claim 8, wherein said pixel extracting part excludes at least luminance values being less than a first predetermined positive luminance value defined by the positive variance and the positive average and at least luminance values being more than a second predetermined negative luminance value defined by the negative variance and the negative average.

10. An image processing apparatus for processing images, comprising:

a color space transforming part transforming an input color space of an input image to a process color space of a processing image having pixels having a luminance value;

a HL/SD values detecting part detecting a HL value that shows a brightest luminance value of the pixels of the processing image and an SD value that shows a darkest luminance value of the pixels of the processing image;

a white balance correcting part correcting an improper white balance of the processing image;

a gradation correcting part correcting a luminance gradation of the processing image based on a gradation correction line;

a leveling part leveling a luminance distribution of the processing image based on variances and leveling rates of the processing image;

a γ-converting part converting a luminance average of the processing image to a γ-value and correcting the luminance of the processing image based on the γ-value;

a magnifying rate determining part determining whether an image size change request is a magnifying request or a reducing request when the image size change request is conducted and determining whether or not a magnifying rate is greater then a predetermined magnifying rate when the image size change request is the magnifying request;

a first calculating part calculating the luminance values of non-vertex pixels of the processing image based on a first compensation algorithm when the magnifying rate determining part determines that the magnifying rate is smaller than the predetermined magnifying rate; and a second calculating part calculating the luminance values of the non-vertex pixels of the processing image based on a second compensation algorithm when the magnifying rate determining part determines that the magnifying rate is equal to or greater than the predetermined magnifying rate, thereby image noises are eliminated.

11. The image processing apparatus as claimed in claim 10, wherein a chromatic value for each of the non-vertex pixels are calculated in accordance with the first compensation algorithm.

12. A method for processing an image comprising:

transforming an input color space of an input image to a process color space of a processing image having pixels having a luminance value;

detecting an HL value that shows a brightest luminance value of the pixels of the processing image and an SD value that shows a darkest luminance value of the pixels of the processing image;

correcting an improper white balance of the processing image;

correcting a luminance gradation of the processing image based on a gradation correction line;

leveling a luminance distribution of the processing image based on variances and leveling rates of the processing image; and converting a luminance average of the processing image to a γ-value and correcting the luminance of the processing image based on the γ-value, thereby image noises are eliminated, wherein said detecting an HL value and an SD value comprises:

extracting HL potential pixels having a potential HL value and SD potential pixels having a potential SD value from the pixels of the processing image;

calculating an average of each HL potential pixel and pixels in a specific vicinity of the HL potential pixel and calculating an average of each SD potential pixel and pixels in a specific vicinity of the SD potential pixel; and specifying a maximum average of all averages for the HL potential pixels and determining the minimum average as the HL value, and specifying a maximum average of all averages for the SD potential pixels and determining the maximum average as the SD value.

13. A method for processing an image comprising:

transforming an input color space of an input image to a process color space of a processing image having pixels having a luminance value;

detecting an HL value that shows a brightest luminance value of the pixels of the processing image and an SD value that shows a darkest luminance value of the pixels of the processing image;

correcting an improper white balance of the processing image;

correcting a luminance gradation of the processing image based on a gradation correction line;

leveling a luminance distribution of the processing image based on variances and leveling rates of the processing image; and converting a luminance average of the processing image to a γ-value and correcting the luminance of the processing image based on the γ-value, thereby image noises are eliminated, wherein said correcting a luminance gradation comprises:

calculating a correction reference value based on the luminance values of the pixels in the processing image;

determining a first quadratic curve when the luminance value is an input variable, a first correction amount is an output variable for shifting the HL value to a maximum luminance value and the correction reference value is fixed, and a second quadratic curve when the luminance value is an input variable, a second correction amount is an output variable for shifting the SD value to a minimum luminance value and the correction reference value is fixed; and correcting the luminance values of the pixels in the processing image in accordance with the first quadratic curve and the second quadratic curve.

14. A method for processing an image comprising:

transforming an input color space of an input image to a process color space of a processing image having pixels having a luminance value;

detecting an HL value that shows a brightest luminance value of the pixels of the processing image and an SD value that shows a darkest luminance value of the pixels of the processing image;

correcting an improper white balance of the processing image;

correcting a luminance gradation of the processing image based on a gradation correction line;

leveling a luminance distribution of the processing image based on variances and leveling rates of the processing image; and converting a luminance average of the processing image to a γ-value and correcting the luminance of the processing image based on the γ-value, thereby image noises are eliminated, wherein said leveling a luminance distribution comprises:

calculating a variance of the luminance values of the processing image;

determining a level rate corresponding to the variance by using a correction line when the variance is an input variable and the level rate is an output variable so that the level rate is inversely proportional to the variance; and correcting the luminance values of the processing image based on the level rate determined.

15. A method for processing an image comprising:

transforming an input color space of an input image to a process color space of a processing image having pixels having a luminance value;

detecting an HL value that shows a brightest luminance value of the pixels of the processing image and an SD value that shows a darkest luminance value of the pixels of the processing image;

correcting an improper white balance of the processing image;

correcting a luminance gradation of the processing image based on a gradation correction line;

leveling a luminance distribution of the processing image based on variances and leveling rates of the processing image; and converting a luminance average of the processing image to a γ-value and correcting the luminance of the processing image based on the γ-value, wherein said converting a luminance average comprises:

calculating an average of the luminance values of the processing image;

determining a γ-value corresponding to the average by using a correction line when the average is an input variable and the γ-value is an output variable so that the γ-value approximates to '1' while the average approximates to a brightest luminance value; and correcting the luminance values of the processing image based on the γ-value determined.

16. A computer-readable recording medium recorded with program code for causing a computer to process an image, said program comprising the code for:

transforming an input color space of an input image to a process color space of a processing image having pixels having a luminance value;

detecting an HL value that shows a brightest luminance value of the pixels of the processing image and an SD value that shows a darkest luminance value of the pixels of the processing image;

correcting an improper white balance of the processing image;

correcting a luminance gradation of the processing image based on a gradation correction line;

leveling a luminance distribution of the processing image based on variances and leveling rates of the processing image; and converting a luminance average of the processing image to a γ-value and correcting the luminance of the processing image based on the γ-value, thereby image noises are eliminated, wherein said detecting an HL value and an SD value comprises the code for:
- extracting HL potential pixels having a potential HL value and SD potential pixels having a potential SD value from the pixels of the processing image;
- calculating an average of each HL potential pixel and pixels in a specific vicinity of the HL potential pixel and calculating an average of each SD potential pixel and pixels in a specific vicinity of the SD potential pixel; and
- specifying a maximum average of all averages for the HL potential pixels and determining the minimum average as the HL value, and specifying a maximum average of all averages for the SD potential pixels and determining the maximum average as the SD value.

17. A computer-readable recording medium recorded with program code for causing a computer to process an image, said program comprising the code for:

transforming an input color space of an input image to a process color space of a processing image having pixels having a luminance value;

detecting an HL value that shows a brightest luminance value of the pixels of the processing image and an SD value that shows a darkest luminance value of the pixels of the processing image;

correcting an improper white balance of the processing image;

correcting a luminance gradation of the processing image based on a gradation correction line;

leveling a luminance distribution of the processing image based on variances and leveling rates of the processing image; and converting a luminance average of the processing image to a γ-value and correcting the luminance of the processing image based on the γ-value, thereby image noises are eliminated, wherein said correcting a luminance gradation comprises the code for:
- calculating a correction reference value based on the luminance values of the pixels in the processing image;
- determining a first quadratic curve when the luminance value is an input variable, a first correction amount is an output variable for shifting the HL value to a maximum luminance value and the correction reference value is fixed, and a second quadratic curve when the luminance value is an input variable, a second correction amount is an output variable for shifting the SD value to a minimum luminance value and the correction reference value is fixed; and
- correcting the luminance values of the pixels in the processing image in accordance with the first quadratic curve and the second quadratic curve.

18. A computer-readable recording medium recorded with program code for causing a computer to process an image, said program comprising the code for:

transforming an input color space of an input image to a process color space of a processing image having pixels having a luminance value;

detecting an HL value that shows a brightest luminance value of the pixels of the processing image and an SD value that shows a darkest luminance value of the pixels of the processing image;

correcting an improper white balance of the processing image;

correcting a luminance gradation of the processing image based on a gradation correction line;

leveling a luminance distribution of the processing image based on variances and leveling rates of the processing image; and converting a luminance average of the processing image to a γ-value and correcting the luminance of the processing image based on the γ-value, thereby image noises are eliminated, wherein said leveling a luminance distribution comprises the code for:
- calculating a variance of the luminance values of the processing image;
- determining a level rate corresponding to the variance by using a correction line when the variance is an input variable and the level rate is an output variable so that the level rate is inversely proportional to the variance; and
- correcting the luminance values of the processing image based on the level rate determined.

19. A computer-readable recording medium recorded with program code for causing a computer to process an image, said program comprising the code for:

transforming an input color space of an input image to a process color space of a processing image having pixels having a luminance value;

detecting an HL value that shows a brightest luminance value of the pixels of the processing image and an SD value that shows a darkest luminance value of the pixels of the processing image;

correcting an improper white balance of the processing image;

correcting a luminance gradation of the processing image based on a gradation correction line;

leveling a luminance distribution of the processing image based on variances and leveling rates of the processing image; and converting a luminance average of the processing image to a γ-value and correcting the luminance of the processing image based on the γ-value, thereby image noises are eliminated, wherein said converting a luminance average comprises the code for:
- calculating an average of the luminance values of the processing image;
- determining a γ-value corresponding to the average by using a correction line when the average is an input variable and they γ-value is an output variable so that the γ-value approximates to '1' to a brightest luminance value; and
- correcting the luminance values of the processing image based on the γ-value determined.

* * * * *

UNITED STATES PATENT AND TRADEMARK OFFICE
CERTIFICATE OF CORRECTION

PATENT NO.   : 6,664,973 B1  
DATED        : December 16, 2003  
INVENTOR(S)  : Masayuki Iwamoto et al.

It is certified that error appears in the above-identified patent and that said Letters Patent is hereby corrected as shown below:

<u>Title page,</u>
Item [54], title should read as follows: -- APPARATUS, METHOD, AND COMPUTER-READABLE MEDIUM FOR AUTOMATICALLY PROCESSING IMAGES AND ELIMINATING IMAGE NOISE --

Signed and Sealed this

Sixth Day of April, 2004

JON W. DUDAS
*Acting Director of the United States Patent and Trademark Office*

UNITED STATES PATENT AND TRADEMARK OFFICE
CERTIFICATE OF CORRECTION

PATENT NO.   : 6,664,973 B1
DATED        : December 16, 2003
INVENTOR(S)  : Masayuki Iwamoto et al.

It is certified that error appears in the above-identified patent and that said Letters Patent is hereby corrected as shown below:

<u>Title page,</u>
Item [30], Foreign Application Priority Data, change "April 28, 1996" to -- April 28, 1999 --.

Signed and Sealed this

Eighth Day of June, 2004

JON W. DUDAS
*Acting Director of the United States Patent and Trademark Office*